US011780359B2

(12) United States Patent
Kloepfer et al.

(10) Patent No.: US 11,780,359 B2
(45) Date of Patent: Oct. 10, 2023

(54) CYLINDRICAL SEMI-TRAILER

(71) Applicants: Michael Kloepfer, Delhi (CA); James Bult, Monee, IL (US)

(72) Inventors: Michael Kloepfer, Delhi (CA); James Bult, Monee, IL (US); Andrew Joseph Maertens, Delhi (CA)

(73) Assignees: Michael Kloepfer, Delhi (CA); James Bult, Monee, IL (US)

( * ) Notice: Subject to any disclaimer, the term of this patent is extended or adjusted under 35 U.S.C. 154(b) by 689 days.

(21) Appl. No.: 16/471,795

(22) PCT Filed: Dec. 19, 2017

(86) PCT No.: PCT/CA2017/051538
§ 371 (c)(1),
(2) Date: Jun. 20, 2019

(87) PCT Pub. No.: WO2018/112618
PCT Pub. Date: Jun. 28, 2018

(65) Prior Publication Data
US 2020/0114800 A1    Apr. 16, 2020

Related U.S. Application Data

(60) Provisional application No. 62/436,960, filed on Dec. 20, 2016.

(51) Int. Cl.
*B60P 3/22*     (2006.01)
*B62D 53/08*    (2006.01)
*B62D 63/06*    (2006.01)
(52) U.S. Cl.
CPC ............ *B60P 3/2205* (2013.01); *B62D 53/08* (2013.01); *B62D 63/062* (2013.01)

(58) Field of Classification Search
CPC ..... B60P 3/2205; B62D 53/08; B62D 63/062;
B62D 33/044; B62D 53/06; B62D 63/06;
B65D 88/06; B65D 90/08
See application file for complete search history.

(56) References Cited

U.S. PATENT DOCUMENTS

| 1,847,310 A | 3/1932 | Schmitz |
| 1,966,244 A | 7/1934 | Hansen |

(Continued)

FOREIGN PATENT DOCUMENTS

| CN | 101269435 A | 9/2008 |
| CN | 102248314 A | 11/2011 |

(Continued)

OTHER PUBLICATIONS

Canadian Office Action dated Apr. 29, 2021, issued in connection with Canadian Patent Application No. 3,090,574 (5 pages).

(Continued)

*Primary Examiner* — Jacob D Knutson
*Assistant Examiner* — Marlon A Arce
(74) *Attorney, Agent, or Firm* — McCarter & English, LLP

(57) ABSTRACT

A cylindrical cargo container is formed of longitudinal, extruded arcuate panels joined pairwise at abutting edges to form a cylindrical tube. The container is mountable on a separate wheeled chassis to form a semi-trailer or railcar, or a chassis integral with a truck. The container may be substantially smooth on inner and outer surfaces, to provide optimal aerodynamics and freedom of motion of cargo within the container. The panels may have inner and outer skins bridged by multiple webs. Such structure may provide protection from punctures to the outer or inner skins. The container is useful to transport waste including municipal or industrial waste, and may be part of a tipper trailer. The (Continued)

container, trailer, truck, or railcar may be used with a compactor for compacting the waste within the container.

23 Claims, 19 Drawing Sheets

(56) References Cited

U.S. PATENT DOCUMENTS

| | | | |
|---|---|---|---|
| 2,078,939 A | 5/1937 | Ferguson | |
| 2,408,517 A | 10/1946 | Howard | |
| 2,458,686 A | 1/1949 | Davie | |
| 2,486,378 A | 11/1949 | Amiot | |
| 2,777,606 A | 1/1957 | Moore et al. | |
| 3,131,949 A | 5/1964 | Black | |
| 3,159,911 A | 12/1964 | Albert et al. | |
| 3,187,425 A * | 6/1965 | Black | B60P 3/2255 |
| | | | 29/469 |
| 3,374,528 A | 3/1968 | Bowcutt et al. | |
| 3,414,950 A | 12/1968 | Phariss | |
| 3,480,158 A | 11/1969 | Pandjiris | |
| 3,570,109 A | 3/1971 | Harlan et al. | |
| 3,575,312 A | 4/1971 | Luisada | |
| 3,625,137 A | 12/1971 | Johnson | |
| 3,734,387 A | 5/1973 | Sannipoli | |
| 3,823,842 A | 7/1974 | Chang | |
| 3,910,480 A | 10/1975 | Thatcher | |
| 3,935,993 A | 2/1976 | Doyen et al. | |
| 3,971,491 A | 7/1976 | Mowatt-Larssen et al. | |
| 4,025,034 A | 5/1977 | Randolph et al. | |
| 4,039,115 A | 8/1977 | Randolph et al. | |
| 4,081,651 A | 3/1978 | Randolph et al. | |
| 4,108,329 A | 8/1978 | Kabilka et al. | |
| 4,170,813 A | 10/1979 | Baird et al. | |
| 4,250,813 A | 2/1981 | Slavens et al. | |
| 4,259,776 A | 4/1981 | Roda | |
| 4,341,938 A | 7/1982 | Matsubara et al. | |
| 4,356,615 A | 11/1982 | Dearman | |
| 4,492,015 A | 1/1985 | Dearman | |
| 4,500,764 A | 2/1985 | Girodi et al. | |
| 4,504,047 A | 3/1985 | Jantzen | |
| 4,666,138 A | 5/1987 | Dearman | |
| 5,042,395 A * | 8/1991 | Wackerle | B61D 17/00 |
| | | | 296/193.04 |
| 5,047,101 A | 9/1991 | Trussler | |
| 5,126,523 A | 6/1992 | Rinaldi | |
| 5,203,197 A | 4/1993 | Depperman | |
| 5,285,947 A | 2/1994 | Depperman | |
| D350,839 S | 9/1994 | Ledesma | |
| 5,435,478 A | 7/1995 | Wood et al. | |
| 5,662,145 A | 9/1997 | Stagg | |
| 5,692,285 A | 12/1997 | Weimer et al. | |
| 5,697,511 A | 12/1997 | Bampton | |
| 5,743,992 A | 4/1998 | Weimer et al. | |
| 6,012,892 A | 1/2000 | Stragier | |
| 6,193,137 B1 | 2/2001 | Ezumi et al. | |
| 6,247,634 B1 | 6/2001 | Whitehouse | |
| 6,250,873 B1 | 6/2001 | Stragier | |
| 6,276,058 B1 | 8/2001 | Gallinger et al. | |
| 6,505,393 B2 | 1/2003 | Stoewer et al. | |
| 6,581,819 B1 | 6/2003 | Aota et al. | |
| 6,688,673 B2 | 2/2004 | Kloepfer | |
| 6,719,360 B1 * | 4/2004 | Backs | B62D 33/023 |
| | | | 296/186.1 |
| 6,840,433 B2 | 1/2005 | Vermaat | |
| 6,854,789 B2 | 2/2005 | Kloepfer | |
| 6,875,942 B2 | 4/2005 | Coughlin et al. | |
| 7,125,237 B2 | 10/2006 | Buge et al. | |
| 7,328,874 B2 | 2/2008 | Tenma et al. | |
| 7,430,888 B2 | 10/2008 | Osame | |
| 7,596,843 B2 | 10/2009 | Spishak et al. | |
| 7,748,592 B2 | 7/2010 | Koga et al. | |
| 7,802,412 B2 | 9/2010 | Jensen | |
| 7,950,722 B2 | 5/2011 | Booher | |
| 7,975,622 B2 | 7/2011 | Dalrymple et al. | |
| D653,587 S | 2/2012 | Haut et al. | |
| 8,123,104 B1 | 2/2012 | Potter et al. | |
| 8,132,708 B1 | 3/2012 | Potter et al. | |
| 8,141,764 B1 | 3/2012 | Potter et al. | |
| D658,548 S | 5/2012 | Silva e Costa et al. | |
| D668,582 S | 10/2012 | Doron | |
| 8,313,595 B2 | 11/2012 | Blanc et al. | |
| 8,408,443 B2 | 4/2013 | Miryekta et al. | |
| 8,408,529 B2 | 4/2013 | Falk et al. | |
| 8,534,530 B2 | 9/2013 | Biggs | |
| 8,550,542 B1 * | 10/2013 | Booher | B62D 35/001 |
| | | | 296/183.1 |
| 8,590,276 B2 | 11/2013 | Kryger et al. | |
| 8,714,433 B1 | 5/2014 | Snead et al. | |
| D710,763 S | 8/2014 | Maiorana et al. | |
| 8,985,376 B2 | 3/2015 | Musso | |
| 9,090,328 B2 | 7/2015 | Goehlich | |
| 9,457,932 B2 | 10/2016 | Kenealy et al. | |
| 9,469,352 B2 | 10/2016 | Booher et al. | |
| 9,789,916 B1 | 10/2017 | Beelman, III et al. | |
| 9,981,831 B2 | 5/2018 | Terzuolo et al. | |
| 10,046,865 B2 | 8/2018 | Smith et al. | |
| 10,086,962 B2 | 10/2018 | Granger et al. | |
| 10,160,076 B2 | 12/2018 | Chang et al. | |
| 10,245,685 B2 | 4/2019 | Simmons | |
| 10,272,950 B1 * | 4/2019 | Smith, Jr. | B62D 33/02 |
| 10,414,004 B1 | 9/2019 | Theriot | |
| 10,663,103 B2 | 5/2020 | Strother et al. | |
| 10,759,008 B1 | 9/2020 | Theriot | |
| 10,895,082 B1 | 1/2021 | Werlinger | |
| D915,945 S | 4/2021 | Kloepfer et al. | |
| 11,034,278 B2 * | 6/2021 | Kloepfer | B23K 33/006 |
| 11,446,775 B2 | 9/2022 | Schahuber | |
| 2002/0163224 A1 * | 11/2002 | Kloepfer | B62D 33/046 |
| | | | 296/186.1 |
| 2004/0035171 A1 | 2/2004 | Gormany | |
| 2004/0113458 A1 | 6/2004 | Kloepfer | |
| 2006/0118235 A1 | 6/2006 | Lum et al. | |
| 2006/0170249 A1 * | 8/2006 | Conny | B23K 33/008 |
| | | | 296/186.1 |
| 2006/0237992 A1 * | 10/2006 | Lemmons | B62D 33/046 |
| | | | 296/186.1 |
| 2006/0284047 A1 | 12/2006 | Spishak et al. | |
| 2007/0256288 A1 | 11/2007 | Vermaat | |
| 2008/0143142 A1 * | 6/2008 | Lemmons | B62D 53/06 |
| | | | 296/186.1 |
| 2008/0256776 A1 | 10/2008 | Neuhaus et al. | |
| 2009/0050613 A1 | 2/2009 | Prasek | |
| 2009/0288719 A1 | 11/2009 | Adams et al. | |
| 2009/0297325 A1 | 12/2009 | Daraie et al. | |
| 2010/0213244 A1 | 8/2010 | Miryekta et al. | |
| 2011/0031257 A1 | 2/2011 | Metz | |
| 2011/0042384 A1 | 2/2011 | Pfau | |
| 2011/0198145 A1 | 8/2011 | Bullis | |
| 2011/0272303 A1 | 11/2011 | Peterken | |
| 2013/0008881 A1 | 1/2013 | Berbakov | |
| 2013/0098906 A1 | 4/2013 | Lovelace et al. | |
| 2013/0186890 A1 | 7/2013 | Moody et al. | |
| 2013/0206778 A1 | 8/2013 | Lukyanets et al. | |
| 2013/0292387 A1 | 11/2013 | Spencer et al. | |
| 2014/0137389 A1 | 5/2014 | Dagenais | |
| 2014/0150871 A1 | 6/2014 | Goodier | |
| 2014/0265436 A1 | 9/2014 | Maiorana et al. | |
| 2014/0366771 A1 | 12/2014 | Bianchi | |
| 2015/0031122 A1 | 1/2015 | Claypool | |
| 2015/0102544 A1 | 4/2015 | Bortoli | |
| 2016/0129826 A1 | 5/2016 | Yielding et al. | |
| 2016/0339968 A1 | 11/2016 | Kloepfer et al. | |
| 2017/0234045 A1 * | 8/2017 | Buckner | E05C 19/12 |
| | | | 220/324 |
| 2017/0253168 A1 * | 9/2017 | Cannon | B60P 3/224 |
| 2017/0254477 A1 | 9/2017 | Schimenti et al. | |
| 2017/0299057 A1 | 10/2017 | Doetzer | |
| 2018/0017214 A1 | 1/2018 | Hermiller et al. | |
| 2018/0086245 A1 * | 3/2018 | Heck | B60P 3/00 |
| 2018/0187835 A1 | 7/2018 | Brunsch | |
| 2020/0094727 A1 | 3/2020 | Kloepfer et al. | |

(56) References Cited

U.S. PATENT DOCUMENTS

| | | | |
|---|---|---|---|
| 2020/0270054 A1 | 8/2020 | Kloepfer | |
| 2021/0001565 A1 | 1/2021 | Montgomery | |

FOREIGN PATENT DOCUMENTS

| | | |
|---|---|---|
| CN | 202130744 U | 2/2012 |
| CN | 102803054 A | 11/2012 |
| CN | 203855052 U | 10/2014 |
| CN | 104590407 A | 5/2015 |
| CN | 103273252 B | 8/2015 |
| CN | 204893326 U | 12/2015 |
| CN | 205386696 U | 7/2016 |
| DE | 3038517 C2 | 12/1989 |
| DE | 102009037609 A1 | 2/2011 |
| EP | 0090334 A2 | 10/1983 |
| EP | 1350654 A1 | 10/2003 |
| EP | 2236439 B1 | 5/2012 |
| EP | 3199474 A1 | 8/2017 |
| GB | 1162937 A | 9/1969 |
| JP | S5835074 A | 3/1983 |
| JP | S5939477 A | 3/1984 |
| JP | H08206882 A | 8/1996 |
| JP | 2604226 B2 | 4/1997 |
| JP | 3556888 B2 | 8/2004 |
| JP | 2008179376 A | 8/2008 |
| JP | 2013169594 A | 9/2013 |
| KR | 20120040990 A | 4/2012 |
| WO | 2013083177 A1 | 6/2013 |
| WO | 2014139531 A1 | 9/2014 |
| WO | 2016118152 A1 | 7/2016 |
| WO | 2016170192 A1 | 10/2016 |
| WO | 2016173587 A1 | 11/2016 |
| WO | 2017/121447 A2 | 7/2017 |

OTHER PUBLICATIONS

Canadian Office Action dated Nov. 23, 2021, issued in connection with Canadian Patent Application No. 3,066,390 (4 pages).
Australian Office Action dated Nov. 23, 2021, issued in connection with Australian Patent Application No. 2017383122 (3 pages).
Australian Office Action dated Dec. 3, 2021, issued in connection with Australian Patent Application No. 2017383126 (4 pages).
Canadian Office Action dated Dec. 23, 2021, issued in connection with Canadian Patent Application No. 3,066,401 (5 pages).
Chinese Notification of Intent to Grant dated Dec. 24, 2021, issued in connection with Chinese Patent Application No. 201780086876.4, along with English translation thereof (4 pages).
Office Action dated Feb. 3, 2022, issued in connection with U.S. Appl. No. 17/307,946 (22 pages).
Written Opinion of the International Searching Authority dated Mar. 16, 2018, issued in connection with International Application No. PCT/CA2017/051538 (4 pages).
International Search Report of the International Searching Authority dated Mar. 16, 2018, issued in connection with International Application No. PCT/CA2017/051538 (4 pages).
International Preliminary Report on Patentability dated Apr. 4, 2019, issued in connection with International Application No. PCT/CA2017/051538 (7 pages).
Notice of Allowance dated Dec. 11, 2020, issued in connection with U.S. Appl. No. 29/588,405 (7 pages).
Notice of Allowance dated Feb. 1, 2021, issued in connection with U.S. Appl. No. 16/471,835 (8 pages).
Chinese Office Action dated Jan. 20, 2021, issued in connection with Chinese Patent Application No. 201780086854.8 (6 pages)—English Translation Not Available.
Chinese Office Action dated Jan. 27, 2021, issued in connection with Chinese Patent Application No. 201780086876.4 (11 pages)—English Translation Not Available.
Canadian Office Action dated Feb. 9, 2021, issued in connection with Canadian Patent Application No. 3,066,386 (3 pages).
Canadian Office Action dated Feb. 9, 2021, issued in connection with Canadian Patent Application No. 3,066,390 (4 pages).
Extended European Search Report dated Jul. 9, 2020, issued by the European Patent Office in connection with European Patent Application No. 17883510.4 (8 pages).
Office Action dated Sep. 15, 2020, issued by the Canadian Intellectual Property Office in connection with Canadian Patent Application No. CA3090574 (3 pages).
Notice of Allowance dated Sep. 30, 2020, including Examiner-Initiated Interview Summary, issued by the U.S. Patent and Trademark Office in connection with U.S. Appl. No. 16/471,835 (11 pages).
Restriction Requirement dated Jan. 10, 2018, issued by the United States Patent and Trademark Office in connection with U.S. Appl. No. 29/588,405 (6 pages).
Notice of Allowance dated Oct. 23, 2019, issued by the United States Patent and Trademark Office in connection with U.S. Appl. No. 29/588,405 (5 pages).
Office Action dated Feb. 20, 2020, issued by the United States Patent and Trademark Office in connection with U.S. Appl. No. 29/588,405 (7 pages).
Response to Written Opinion filed with the Canadian Receiving Office dated May 30, 2018, in connection with International Patent Application No. PCT/CA2017/051544 (24 pages).
Response to Written Opinion filed with the Canadian Receiving Office dated Jun. 22, 2018, in connection with International Patent Application No. PCT/CA2017/051538 (18 pages).
Office Action dated Jun. 8, 2020, issued in connection with U.S. Appl. No. 16/471,835 (22 pages).
International Search Report and Written Opinion of the International Searching Authority dated Aug. 24, 2018, issued in connection with International Application No. PCT/CA2018/050730 (12 pages).
Written Opinion of the International Preliminary Examining Authority dated Aug. 27, 2019, issued in connection with International Application No. PCT/CA2018/050730 (5 pages).
Office Action dated Jan. 2, 2020, issued by the Canadian Intellectual Property Office in connection with Canadian Patent Application No. CA3039566 (4 pages).
Office Action dated Nov. 7, 2019, issued by the Canadian Intellectual Property Office in connection with Canadian Patent Application No. CA3039568 (5 pages).
International Search Report of the International Searching Authority dated Mar. 12, 2018, issued in connection with International Application No. PCT/CA2017/051544 (3 pages).
Written Opinion of the International Searching Authority dated Mar. 12, 2018, issued in connection with International Application No. PCT/CA2017/051544 (4 pages).
International Preliminary Report on Patentability dated Apr. 4, 2019, issued in connection with International Application No. PCT/CA2017/051544 (8 pages).
Canadian Patent Application No. CA3039566, Office Action dated Sep. 3, 2019 (5 pages).
Non-Final Office Action dated Aug. 6, 2018, issued in connection with U.S. Appl. No. 29/588,405 (10 pages).
Ex Parte Quayle Action dated Jun. 25, 2019, issued in connection with U.S. Appl. No. 29/588,405 (5 pages).
Final Office Action dated Mar. 4, 2019, issued in connection with U.S. Appl. No. 29/588,405 (11 pages).
Extended European Search Report dated Jun. 25, 2021, issued in connection with European Patent Application No. 18859799.1 (9 pages).
Chinese Office Action dated Jul. 22, 2021, issued in connection with Chinese Patent Application No. 201780086854.8, along with English translation thereof (7 pages).
Chinese Office Action dated Jan. 20, 2021, issued in connection with Chinese Patent Application No. 201780086854.8, along with English translation thereof (12 pages).
Chinese Office Action dated Aug. 12, 2021, issued in connection with Chinese Patent Application No. 201780086876.4, along with English translation thereof (6 pages).
Chinese Office Action dated Jan. 27, 2021, issued in connection with Chinese Patent Application No. 201780086876.4, along with English translation thereof (21 pages).

(56) References Cited

OTHER PUBLICATIONS

Extended European Search Report dated Oct. 6, 2020, issued in connection with European Patent Application No. 17882950.3 (8 pages).
International Preliminary Report on Patentability of the International Preliminary Examining Authority dated Dec. 12, 2019 in connection with International Application No. PCT/CA2018/050730, including Response to Written Opinion filed Sep. 20, 2019 (35 pages).
Office Action dated Apr. 20, 2020, issued in connection with Canadian Patent Application No. CA3069573 (4 pages).
Canadian Office Action dated Mar. 1, 2021, issued in connection with Canadian Patent Application No. 3,066,393 (3 pages).
Canadian Office Action dated Mar. 9, 2021, issued in connection with Canadian Patent Application No. 3,066,401 (4 pages).
Restriction Requirement dated Apr. 29, 2022, issued in connection with U.S. Appl. No. 16/649,497 (5 pages).
Office Action dated Jun. 2, 2022, issued in connection with U.S. Appl. No. 17/307,946 (28 pages).
Canadian Office Action dated Jun. 23, 2022, issued in connection with Canadian Patent Application No. 3,066,390 (4 pages).
Canadian Office Action dated Jun. 27, 2022, issued in connection with Canadian Patent Application No. 3,111,124 (3 pages).
Australian Office Action dated Jul. 14, 2022, issued in connection with Australian Patent Application No. 2017383126 (3 pages).
Australian Office Action dated Jul. 29, 2022, issued in connection with Australian Patent Application No. 2018338411 (3 pages).
Advisory Action dated Aug. 12, 2022, issued in connection with U.S. Appl. No. 17/307,946 (5 pages).
Office Action dated Aug. 29, 2022, issued in connection with U.S. Appl. No. 16/649,497 (15 pages).
Office Action dated Nov. 15, 2022, issued in connection with U.S. Appl. No. 17/307,946 (22 pages).
Canadian Office Action dated Nov. 30, 2021, issued in connection with Canadian Application No. 3,090,574 (5 pages).
Notification of Intent to Grant and Examination Report dated Apr. 26, 2022, issued in connection with European Application No. 17883510.4 (11 pages).
Australian Office Action dated May 13, 2022, issued in connection with Australian Application No. 2017383122 (2 pages).
Canadian Office Action dated May 18, 2022, issued in connection with Canadian Application No. 3,066,401 (5 pages).
Elia Levi, "How to Perform Tack Welding Successfully," The Welder, article dated Apr. 11, 2006, https://www.thefabricator.com/thewelder/article/cuttingweldprep/how-to-perform-tack-welding-successfully (6 pages).
Canadian Office Action dated Nov. 7, 2022, issued in connection with Canadian Patent Application No. 3,090,574 (4 pages).
Canadian Office Action dated Feb. 27, 2023, issued in connection with Canadian Patent Application No. 3,111,124 (5 pages).
Notice of Allowance dated Mar. 10, 2023, issued in connection with U.S. Appl. No. 16/649,497 (8 pages.).
Office Action dated Mar. 28, 2023, issued in connection with U.S. Appl. No. 17/307,946 (31 pages).
Australian Office Action dated Feb. 27, 2023, issued in connection with Australian Application No. 2022287666 (4 pages).
Canadian Office Action dated May 1, 2023, issued in connection with Canadian Patent Application No. 3,066,390 (5 pages).
Adviosry Action dated May 26, 2023, in connection with U.S. Appl. No. 17/307,946, including Examiner Interview Summary, Interview Agenda, and AFCP Decision (7 pages).
Australian Office Action dated Jun. 26, 2023, issued in connection with Australian Application No. 2022287666 (4 pages).
Notice of Allowance dated Aug. 10, 2023, issued in connection with U.S. Appl. No. 17/307,946 (19 pages).

\* cited by examiner

CYLINDRICAL SEMI-TRAILER

RELATED APPLICATIONS

The present application is a U.S. National Phase Application under 35 U.S.C. § 371 of International Application No. PCT/CA2017/051538 filed on Dec. 19, 2017, which claims the benefit of priority to United States Provisional Patent Application Serial No. 62/436,960 filed on Dec. 20, 2016, the entire disclosures of both of which are expressly incorporated by reference herein.

FIELD

The present disclosure relates generally to cylindrical cargo trailers including tanker trucks, trailers, and railcars.

BACKGROUND

Cylindrical cargo trailers, such as tanker (or tank) trucks and tanker trailers, are widely used to transport various materials such as liquefied loads, dry bulk cargo, or gases on roads or rails. Whether incorporated in a tanker truck where the container is mounted on a chassis and wheeled suspension commonly with the truck, or a tanker trailer where the container is mounted on its own chassis and wheeled suspension which is towed by a tractor, or a railroad tanker car, the container is typically cylindrical in shape and is mounted on and supported by a chassis and wheeled suspension. Other configurations are possible.

Cylindrical cargo trailers have many advantages which explain their widespread use. Based on simple geometry, for any given volume a cylinder has a smaller surface area than a typical rectangular, box-shaped cargo container. As such, all other factors being equal, a cylindrical container can have both a higher ratio of cargo weight to container weight, and of cargo weight to container materials than a container of another shape. Moreover, cylindrical containers typically have a more aerodynamic shape. Both of these factors result in a lesser towing or carrying load, and thus lesser truck or tractor power requirements, and better fuel economy.

Typically, such cylindrical containers have a construction including a skin formed of a rigid and resilient plate material, usually metal, such as rolled sheet steel or aluminum, and a frame structure, such as annular and longitudinal ribbed beam structure, which may include vertical bands or ribs, to provide shape and strength, and to support the skin, which is affixed to the frame, sometimes by welds. In other cases, a less sturdy and resilient material is used, such as fiberglass or reinforced plastic. In any event, the frame is typically mounted on and supported by the chassis of the truck, trailer, or railcar, and thus the weight of any load contained by the tank is communicated to the chassis ultimately by this frame.

While sometimes the structural frame is disposed at least partly outside of the sheet metal skin, such that at least part of the structural frame is exposed to the outside, doing so usually has the disadvantage of degrading the aerodynamics of the container resulting from wind resistance at the projecting portions. As such, in many cases, the structural frame is completely or mostly enveloped by the sheet metal skin. In some cases, doing so presents a different kind of disadvantage, including for example reduction of the useful volume of the container, or inclusion of obstructions within the container which may impede movement of its contents.

While, as noted, cylindrical tanks are widely used to haul many types of cargo, they are not generally used to haul solid waste such as municipal or industrial garbage. Certain problems arise in this connection, including that cylindrical trailers of conventional construction, as described above, which are sufficiently rigid to withstand the force of garbage compaction, require a volume of structural frame members which renders the trailer too heavy with respect to the economies applicable to waste hauling. To put it another way, while cylindrical trailers of conventional construction were known, their use for hauling waste was uneconomical.

Moreover, in connection with any type of cargo, it is desirable to achieve yet greater efficiencies and advantages from improved construction and use of cylindrical containers which reduce cost and provide new and enhanced uses.

There is therefore a material value in addressing the above deficiencies of conventional cylindrical containers, such as those used in tanker trucks, trailers, and railcars, and to provide yet further advantages.

BRIEF DESCRIPTION OF THE DRAWINGS

Embodiments will now be described, by way of example only, with reference to the attached Figures.

DESCRIPTION

Figure 1:
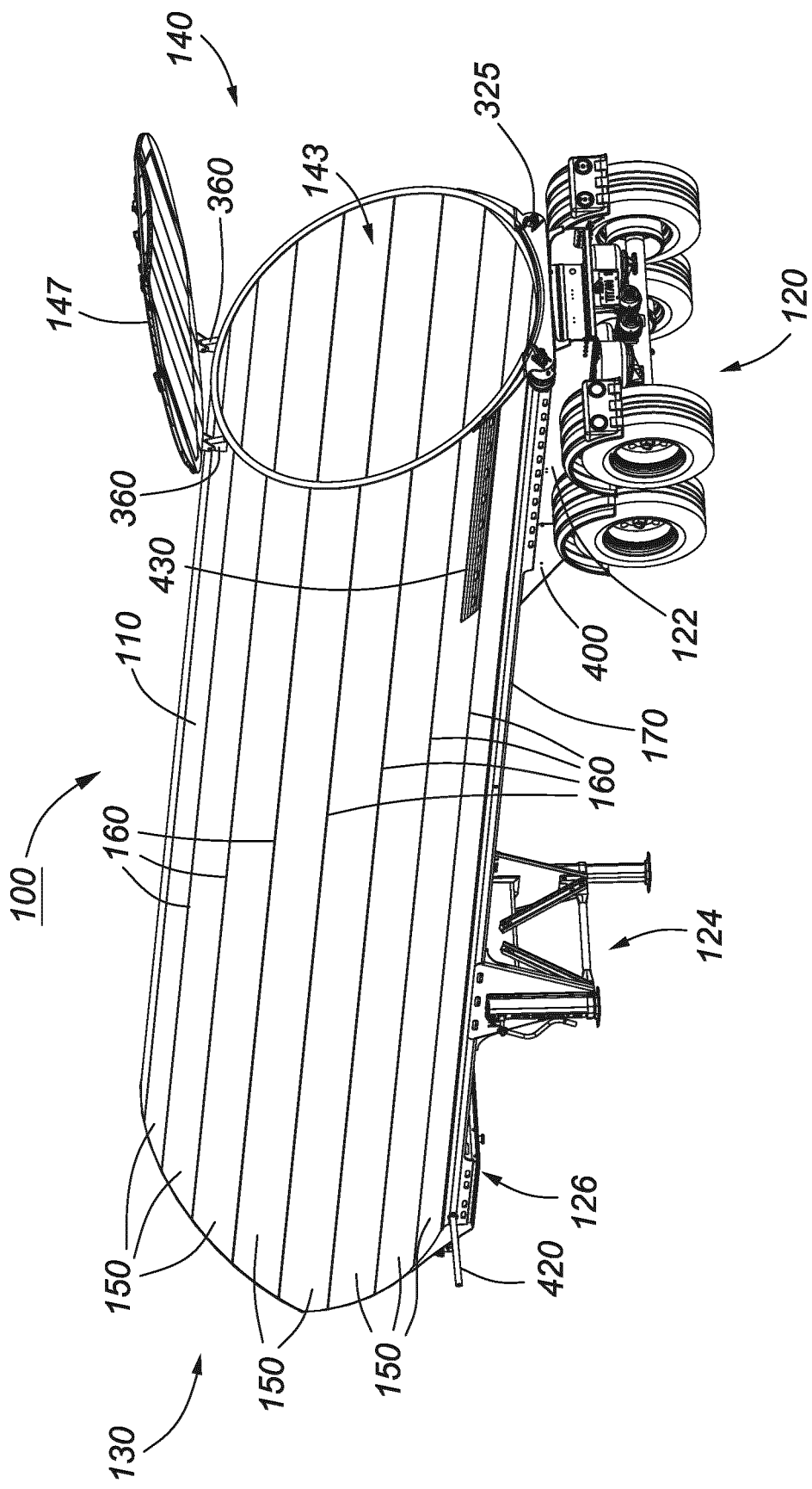
FIG. 1 shows a first perspective view of a cylindrical cargo trailer formed of longitudinal extruded panels.
Figure 2:
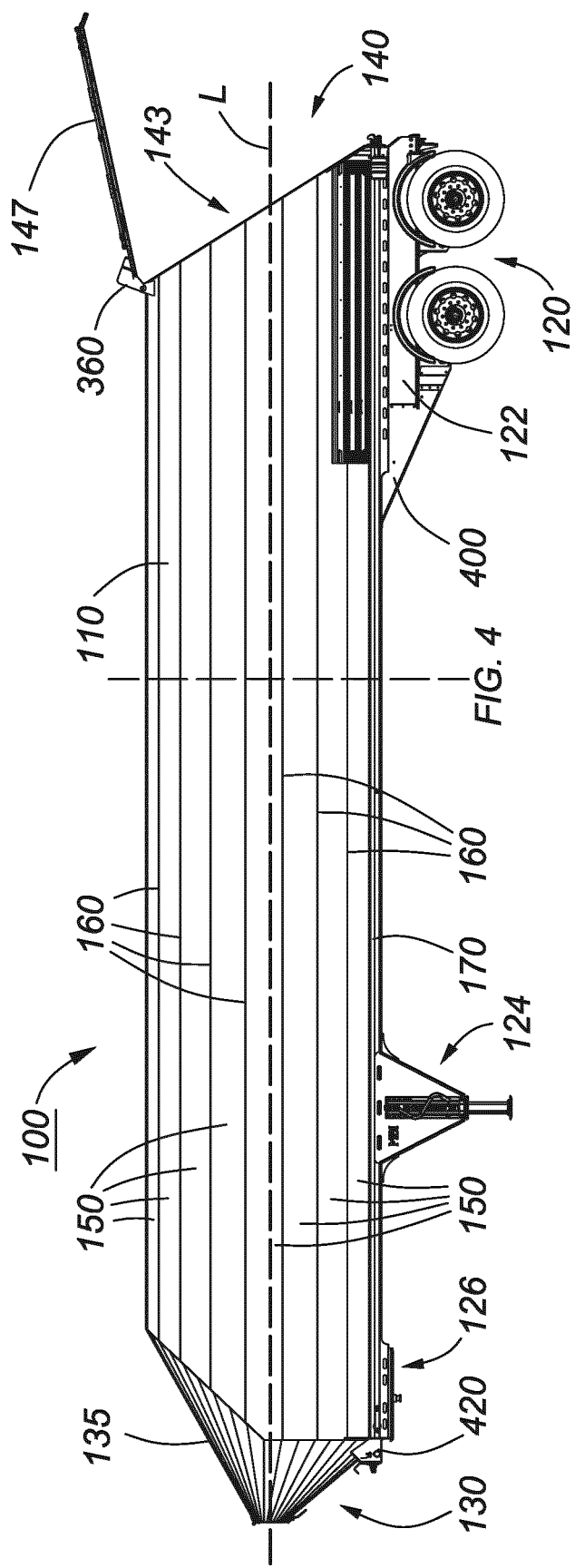
FIG. 2 shows a side view of the cylindrical cargo trailer of FIG. 1.
Figure 3:
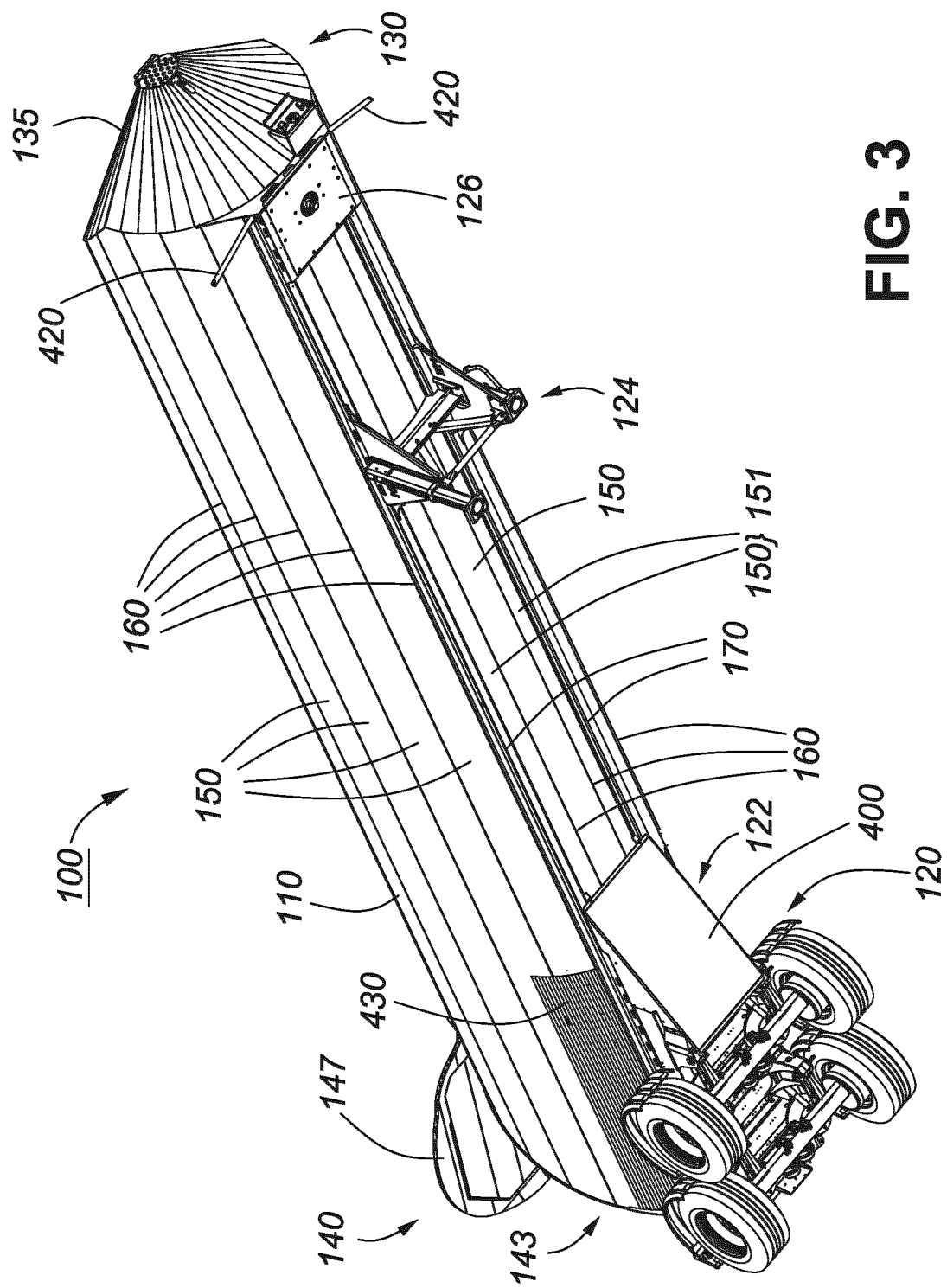
FIG. 3 shows a second perspective view of the cylindrical cargo trailer of FIG. 1.

FIGS. 1 to 3 show a cylindrical cargo trailer 100. The trailer has a container 110 mounted on and supported by a wheeled suspension 120. The container has a generally cylindrical shape, having a corresponding length along a longitudinal axis L of the container (shown in FIG. 2), and a generally circular cross-section characterized by a traverse width or diameter. The container 110 has a front end 130 and an rear end 140 oppositely disposed along the longitudinal axis of the container, and these may be configured in any desired manner, which may depend at least in part on an intended function of the trailer.

For example, if the trailer 100 is configured for use as a tanker trailer for liquefied loads, dry bulk cargo, or gases, then the front end 130 and the rear end 140 of the container may include a front wall 135 and an end wall (not shown), respectively, joined to and enclosing a cylindrical tube, and the container 110 may have means for loading and unloading the container, such as one or more closeable openings (not shown) at a side of the container, as is known in the field.

In other configurations, the container may have a front wall 135 at its front end, but at its rear end may instead have a rear opening 143 for loading and unloading cargo. A plane or face of the rear opening may have any desired configuration, and for example form any desired angle with a longitudinal axis of the trailer, which may be, for example, perpendicular or oblique.

The container 110 may have a tailgate 147 for closing the rear opening 143. The tailgate may be movably mounted at or adjacent a perimeter of the opening 143 in any convenient manner. For example, the tailgate 147 may be hingedly mounted, at or adjacent an edge of the tailgate, at or adjacent an upper edge of the opening, as shown in FIGS. 1 & 2, such that the tailgate 147 is openable by rotating the tailgate 147 upwardly using the hinges 360, and closeable by the opposite motion. Alternatively, the tailgate 147 may be hingedly mounted, at or adjacent an edge of the tailgate, at or adjacent a lateral edge, such as a right edge or left edge, of the opening such that the tailgate 147 is openable by rotating the tailgate 147 laterally, that is to one side, using the hinges, and closeable by the opposite motion. The container 110 may include an appropriate locking mechanism 325 selectively to maintain the tailgate 147 in a locked configuration or to permit the tailgate 147 to open. In this way, the tailgate 147 may be closed to retain cargo in the container 110, and opened to permit loading or discharge of cargo to or from the container 110.

In particular, in some embodiments the trailer 100 may be configured as a tipper trailer, having the tailgate 147 mounted at or adjacent the upper edge of the opening 143. When the trailer is tipped in a manner known in the art, the tailgate 147 may be configured to swing open under its own weight to open the rear opening 143 and to permit discharge of cargo from the container 110. When the locking mechanism 325 of the tailgate 147 is in the locked configuration the tailgate 147 is kept closed, while in the unlocked configuration the tailgate 147 is allowed to open, including by swinging open as previously described. Such tipper trailers may be used to carry municipal or industrial waste, and may be configured to cooperate with tipping mechanisms located at waste landfills to tip the trailer 100 while the locking mechanism 325 is unlocked to discharge the waste from the trailer 100 into the landfill.

Figure 5:
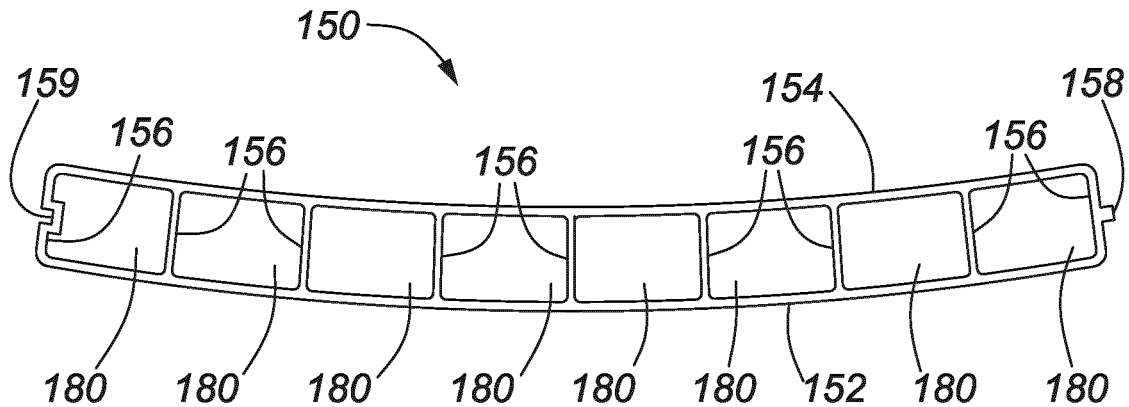
FIG. 5 is a cross-sectional view of a single longitudinal extruded panel.

As shown in FIGS. 1 to 3, the container 110 may be formed of longitudinal, oblong extruded panels 150. As shown in FIG. 5, each panel may have an outer skin 152, an inner skin 154, and a plurality of webs 156 spanning the outer skin 152 and the inner skin 154. The panels 150 may be formed of any suitable material, which may be a metal, which may be steel or aluminum. The outer skin 152, the inner skin 154, and the webs 156 may have any respective dimensions. The following are non-limiting examples. The outer skin 152 may have a thickness of at least 1 mm, or from 1 mm to 4 mm, or from 2 mm to 3 mm, or about 2.5 mm. The inner skin 154 may have a thickness of at least 2 mm, or from 2 mm to 5 mm, or from 3 mm to 4 mm, or about 3.5 mm. The webs 156 may each have a thickness 154 may have a thickness of at least 1 mm, or from 1 mm to 4 mm, or from 2 mm to 3 mm, or about 2.5 mm. The outer skin 152 and the inner skin 154 may be spaced by a gap of at least 30 mm, or from 30 mm to 45 mm, or from 35 mm to 40 mm, or about 38 mm. The webs 156 may be provided in any desired number, which may be at least 6, or 6 to 12, or 8 to 10, or about 9. The webs 156 may be spaced by a gap of at least 15 mm, or 15 mm to 35 mm, or 20 mm to 30 mm, or about 25 mm. Other configurations are possible.

Figure 4:
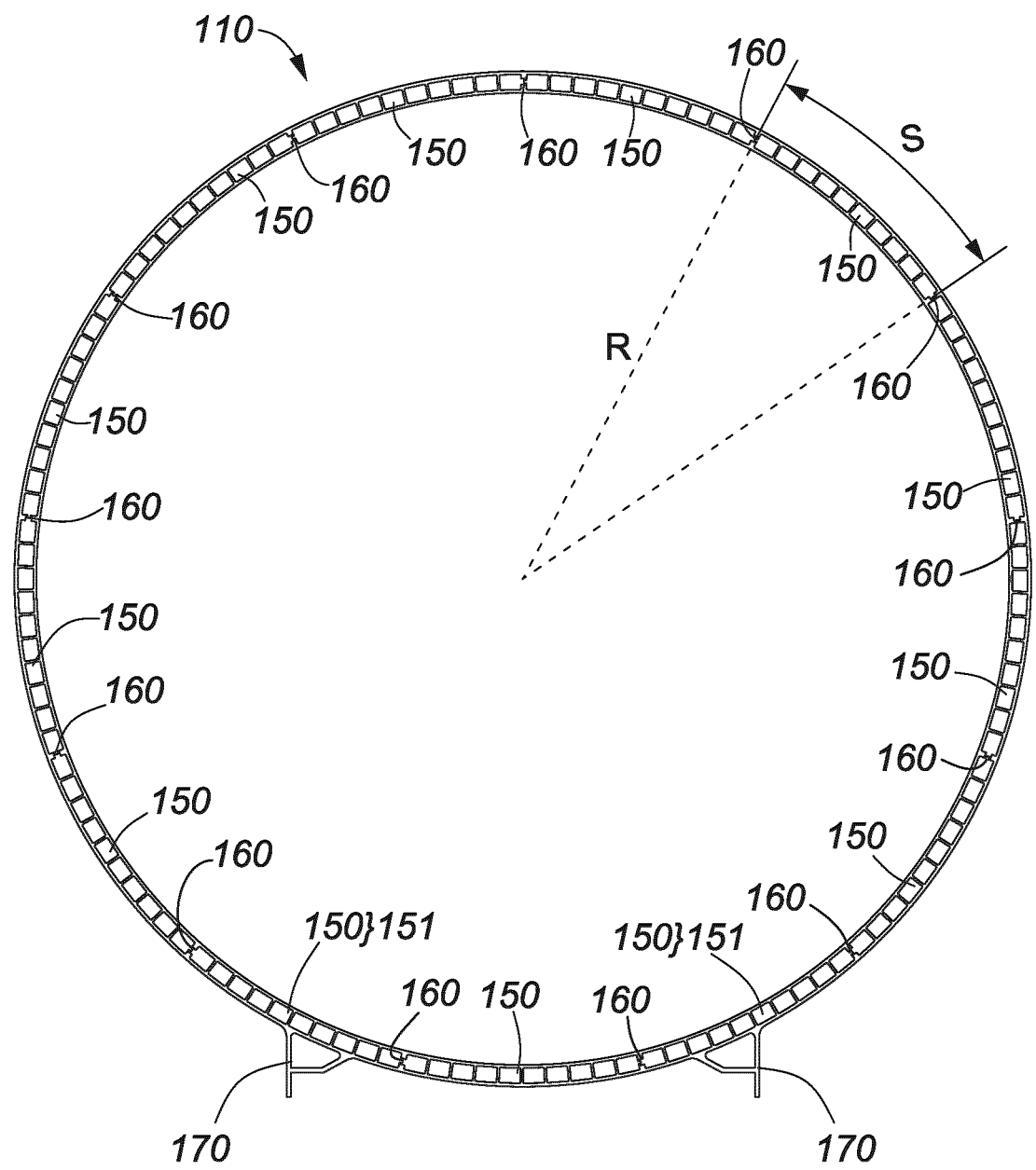
FIG. 4 shows a cross-sectional view of a container of the cylindrical cargo trailer of FIG. 1.

In order to form, when assembled, the cylindrical tube, or cylindrical shell, of the container 110 having a circular cross-section, as shown particularly in FIG. 4, each panel 150 may include an oblong cylinder segment of the cylindrical shell, and be extruded having a cross-section generally arcuate in shape, as shown particularly in FIG. 5, which for all of the panels 150 may have a common arc radius R, or degree of curvature, as shown in FIG. 4. The panels 150 may all have the same arc length S, as shown in FIG. 4, or some of the panels 150 may have a different arc length S from other ones of the panels. Any suitable combination is possible. As shown particularly in FIG. 5, each panel 150 may be extruded with a tongue 158 at a first edge at one end of the arc and a groove 159 at an opposite edge at an opposite end of the arc. The tongues 158 and grooves 159 of the different panels 150 may be configured with respective sizes and shapes to couple fittingly. In this way, a plurality of the panels 150 may be joined at abutting edges by mating the tongue 158 of one panel 150 with the groove 159 of an abutting panel 150 to form a joint 160, and as shown particularly in FIG. 4 multiple panels may be so joined in sequence to form the cylindrical tube. Each of the joints 160 so formed may be cemented or affixed by any suitable means, which may include fasteners or welds. The panels 150 may be of any desired length, which may include a length which bridges the front end 130, which may include the front wall 135, and the rear end 140, which may include an end wall (not shown) or the rear opening 143, as the case may be—in other words, the entire length of the container 110. All of the panels 150 may have the same length, or first ones of the panels 150 may have a first length different from a second length of second ones of the panels 150. Further combinations are possible.

Figure 6:
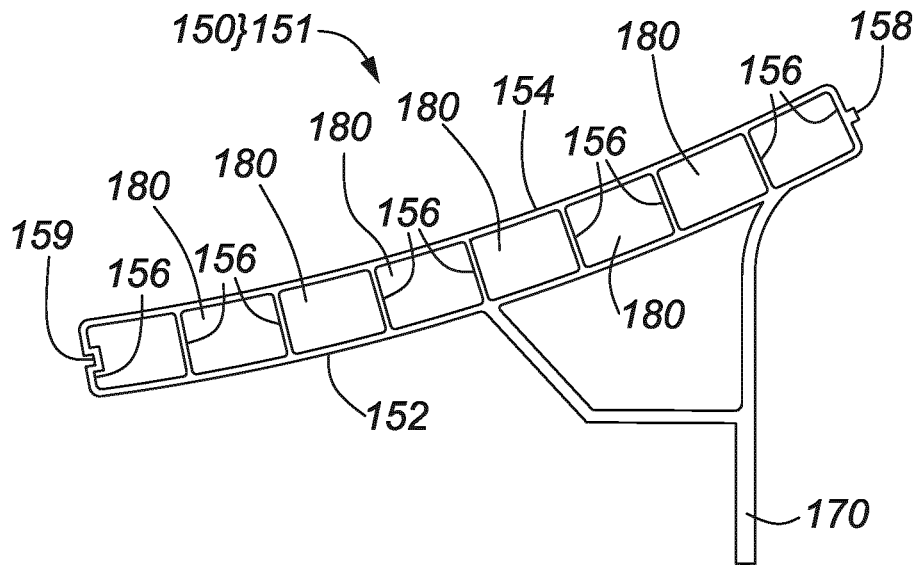
FIG. 6 is a cross-sectional view of a single longitudinal extruded panel having an integral extrusion providing a longitudinal rail or flange to be coupled to a chassis of a wheeled suspension.

As shown particularly in FIG. 6, some of the panels 150 may include panels 151 extruded with a profile including one or more projections configured for selected purposes. For example, and as shown in FIG. 4 one or more, which may be two, of the panels 151 may be extruded with longitudinal rails 170 or flanges to be coupled to a chassis 122 of the wheeled suspension 120, for example by fasteners or welds, for mounting the container 110 to the wheeled suspension 120. In such case, the profiles, include the two profiles, may be configured in such a way that the mounting rails 170 or flanges are positioned and shaped in such a way that is generally symmetrical relative to a vertical plane extending longitudinally and intersecting a center of the circular cross-section of the container 110, as shown particularly in FIG. 4. Such mounting rails 170 may also be configured, sized, and shaped to provide structural strength to the container 110. Other projections may instead or also be included in the extrusion profile of one or more panels 150 for any desired purpose, for example for attachment of landing gear 124 or a fifth wheel, or hitch 126.

Where the panel 151 has a mounting rail 170, the outer skin 152, the inner skin 154, and/or one or more of the webs 156 of the panel 151 may be respectively formed with a greater thickness to provide additional strength and rigidity at or about the portion of the panel 151 adjoining the rail 170, so as better to communicate the weight of the container 110 and its contents to the rail 170 and thence to the wheeled suspension 120. The panel 151 may be formed with its outer skin 152, inner skin 154, and/or webs 156 having respective thicknesses which are uniformly greater relative to the corresponding thicknesses of other ones of the panels 150 not having the rail 170. Alternatively, the panel 151 may be formed such that the respective thicknesses of its outer skin 152 and/or inner skin 154 are generally similar to those of neighbouring panels 150 where the panel 151 adjoins neighbouring panels 150, i.e. at or about its tongue 158 and groove 159, but where the respective thicknesses of its outer skin 152 and/or inner skin 154 grow approaching the portion of the panel 151 which is adjacent to and/or adjoins the rail 170. Similarly, the webs 156 of the panel 151 in the portion of the panel 151 which is adjacent to and/or adjoins the rail 170 may have a thickness which is relatively greater than a thickness of the remaining webs 156 of the panel 151, where the thickness of such remaining webs may be substantially similar to the webs 156 of the other panels 150 not having the rail 170. As with the outer skin 152 and the inner skin 154 of the panel 151, the webs 156 may grow in thickness approaching the portion of the panel 151 which is adjacent to and/or adjoins the rail 170.

The longitudinal panels 150 so provided, assembled, joined, and affixed, to form the cylindrical tube of the container 110, may be configured to function as structural members, and provide each panel 150, and the assembled container 110 as a whole, with structural strength and rigidity both along and transverse the longitudinal axis L of the container. As such, no further reinforcing means may be required, such as annular bands or ribs required by conventional cylindrical containers.

Moreover, due to the lack of any need for such additional structural members, both the inside and the outside surfaces of the container 110 may be made completely smooth, without or with minimal projections. With respect to the outside surface of the container 110, this provides the container with an optimal aerodynamic profile. With respect to the inside surface of the container 110, this completely or maximally reduces the catching, or snagging, or other such impediment to movement of the cargo within the container 110 along the inside surface, thereby facilitating loading and unloading of cargo from the container 110.

Depending upon the intended use of the container 110, the particular configuration of the panels provides yet further advantages.

For example, when the trailer 100 is configured as a tanker trailer for liquefied loads, dry bulk cargo, or gases, the outside skin 152 of the panels 150 may provide protection against impact or puncture from a collision or other blow coming from outside of the container 110. In such case, the blow may cause a rupture in the outer skin 152 of a panel 150, but nevertheless the inner skin 154 may remain intact and its structural integrity unaffected or minimally affected by the presence of the rupture in the outer skin 152.

A similar advantage may be realized when the trailer 100 is configured for the transport of waste, such as municipal or industrial garbage. One issue related to the transport of such waste is that it typically exudes leachate, being liquid which has passed through or about the solid waste and which has extracted soluble or suspended solids. It is desirable to avoid the release of leachate in an uncontrolled manner, as it is regarded to be an environmental hazard. It is desirable, therefore, to ensure that it is not released during transport. Municipal or industrial waste typically includes hard objects, however, which may puncture a surface of a container upon impact. In such case, the present cylindrical container 110, by virtue of the panels 150 having both an inner skin 154 and an outer skin 152, may provide a means of prevention of discharge of leachate, inasmuch as the release of any leachate following puncture of the inner skin 154, for example by impact with hard objects contained in the waste, may be contained by the outer skin 152. Moreover, the webs 156 of the panel 150 may provide one or more channels which limit movement of the leachate.

The cylindrical trailer 100 described above has longitudinal extruded panels 150 which are assembled, joined, and affixed to form the cylindrical tube container 110 of the trailer 100. Other alternative configurations are possible.

Figure 7:
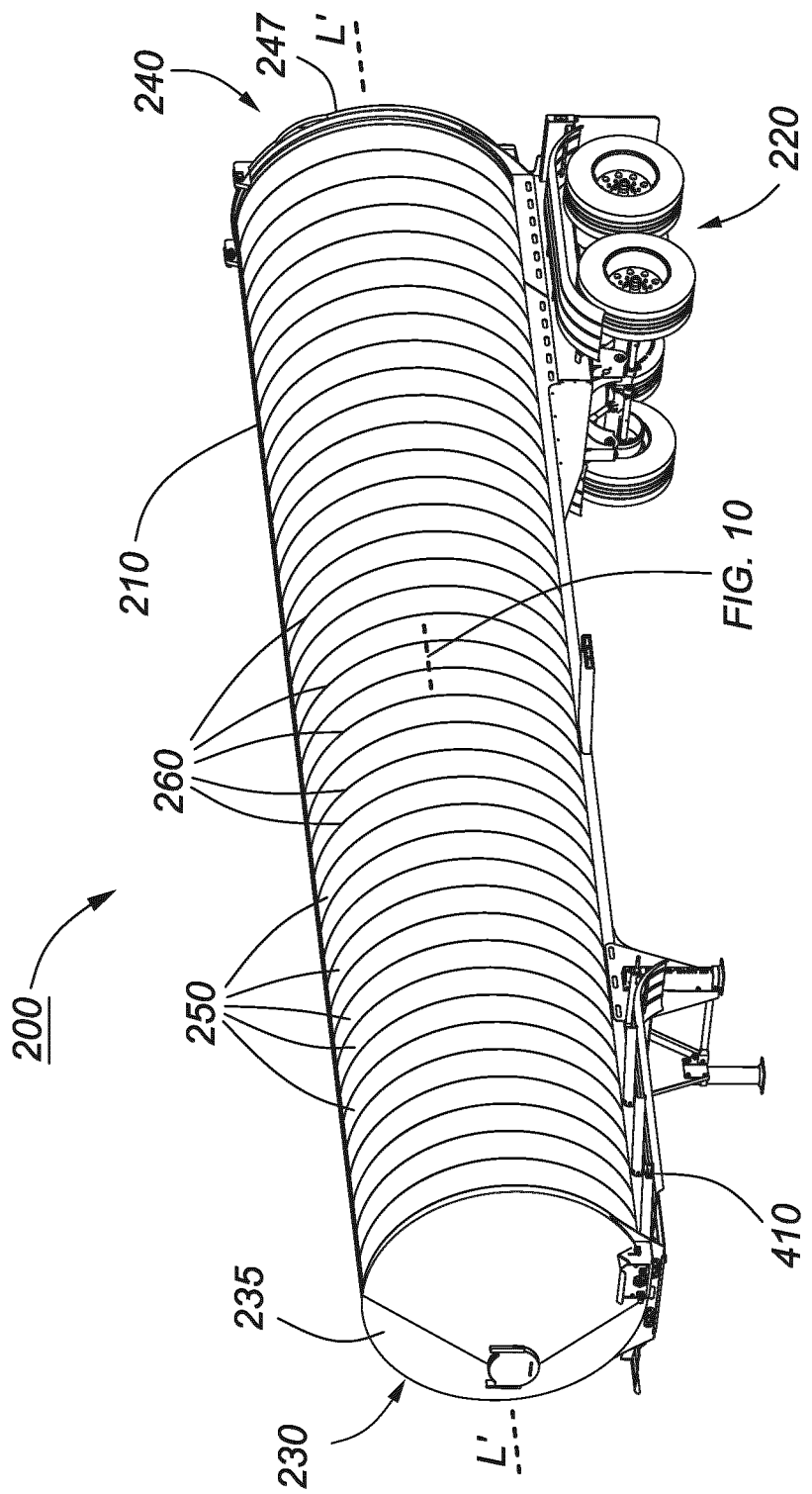
FIG. 7 is a first perspective view of a cylindrical cargo trailer formed of annular extruded panels.
Figure 8:
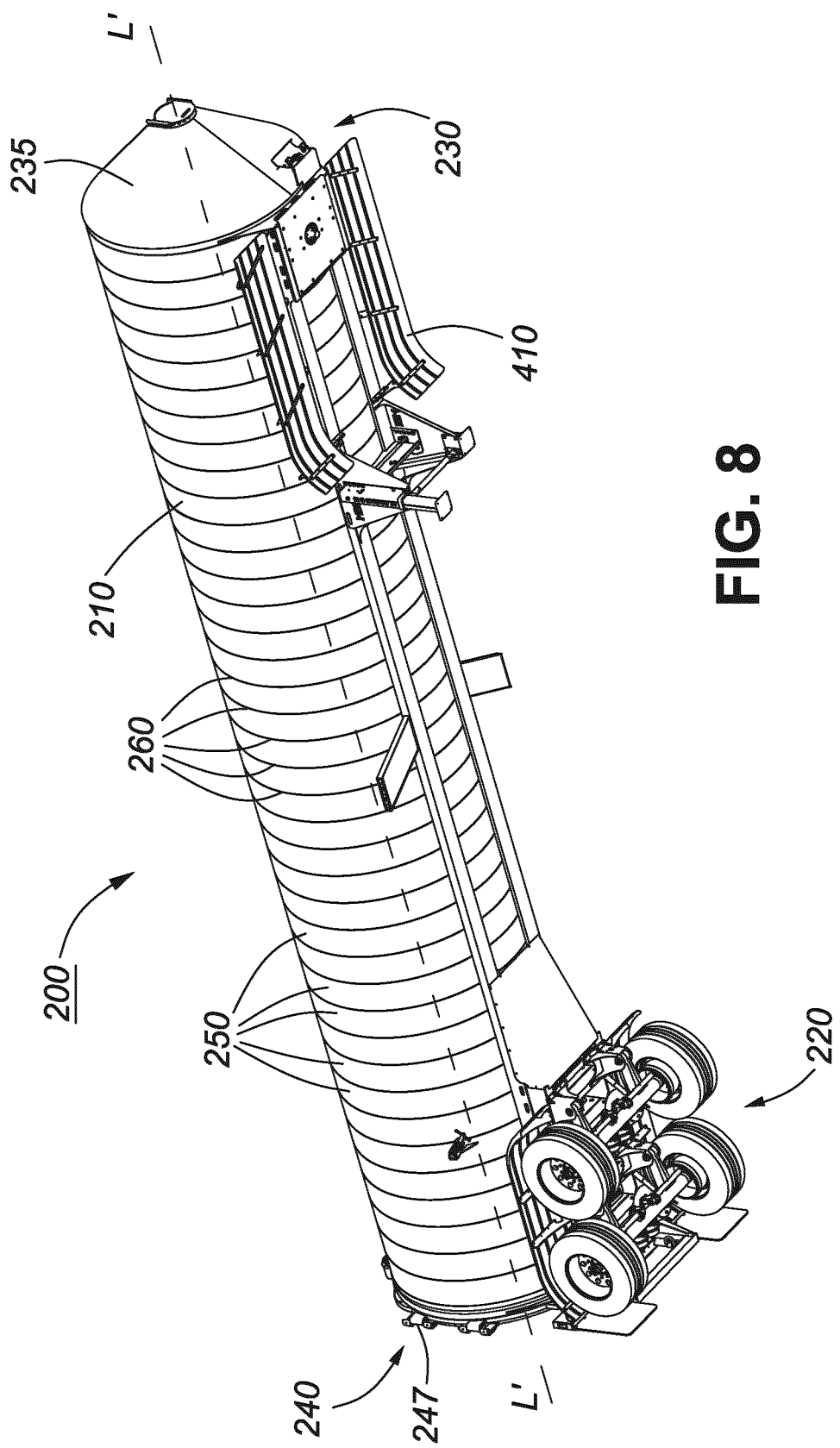
FIG. 8 is a second perspective view of the cylindrical cargo trailer of FIG. 7.
Figure 9:
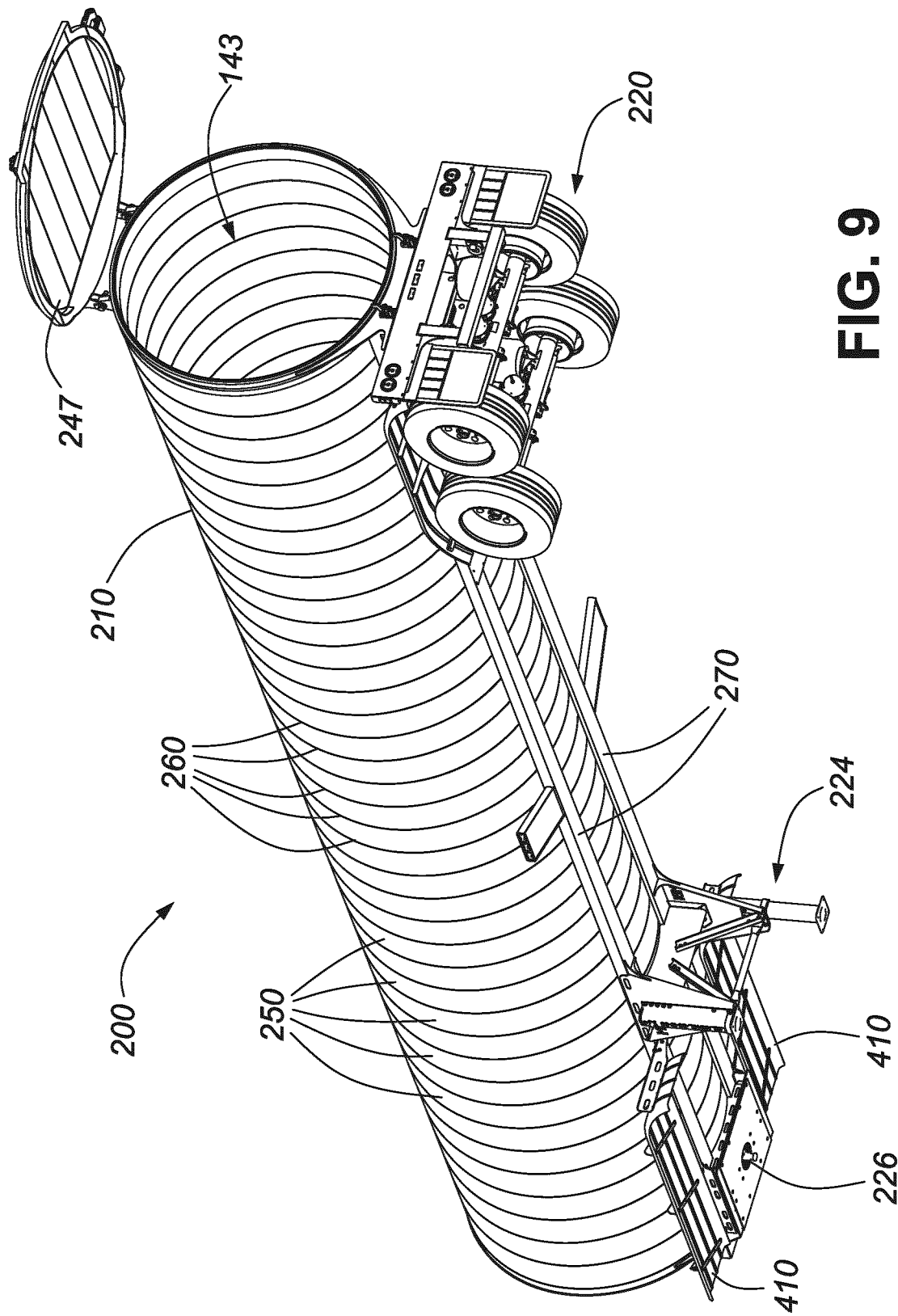
FIG. 9 is a third perspective view of the cylindrical cargo trailer of FIG. 7.

For example, another cylindrical trailer 200 is shown in FIGS. 7 to 9. Similar to trailer 100, trailer 200 trailer has a container 210 mounted on and supported by a wheeled suspension 220. The container has a generally cylindrical shape, having a corresponding length along a longitudinal axis L" of the container, and a generally circular cross-section characterized by a traverse width or diameter. The container 210 has a front end 230 and an rear end 240 oppositely disposed along the longitudinal axis of the container, and these may be configured in any desired manner, which may depend at least in part on an intended function of the trailer. For example, the cylindrical trailer 200 may be configured as a tanker trailer, where the front end 230 and rear end 240 include a front wall 235 and an end wall (not shown), respectively. Alternatively, the rear end 240 may include a rear opening 243 for loading and unloading cargo, and the container 210 may have a tailgate 247 for closing the rear opening 243 as described above. As with trailer 100, trailer 200 may be configured as a tipper trailer.

Figure 10:
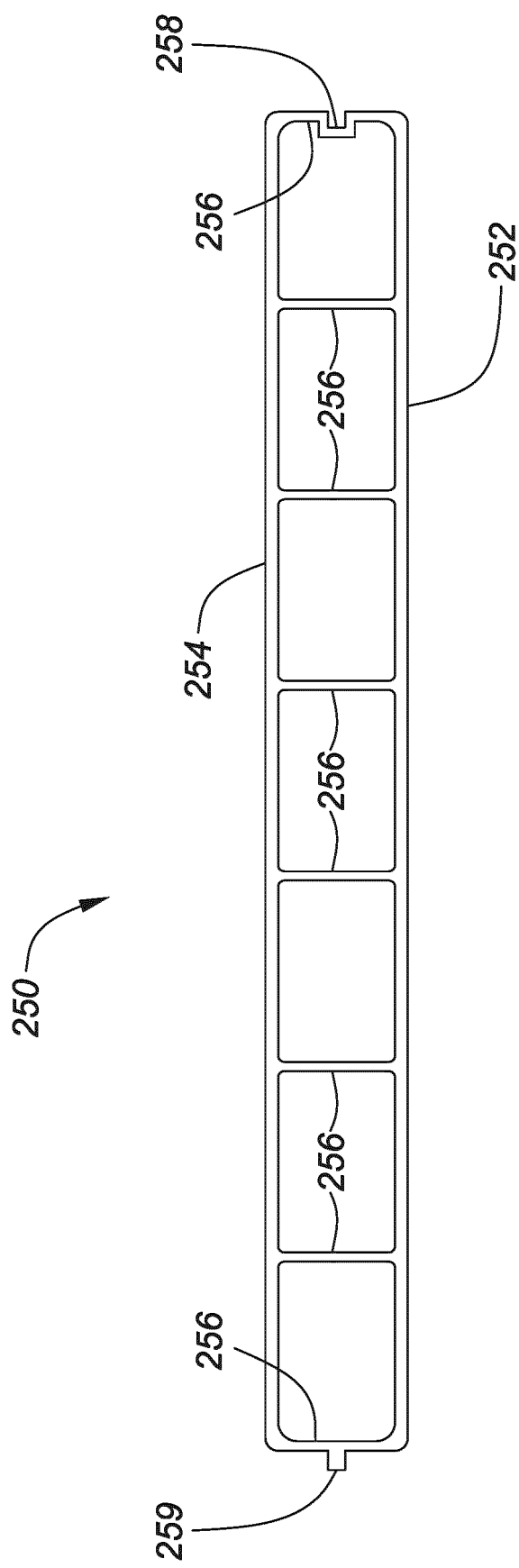
FIG. 10 is a cross-sectional view of a single annular extruded panel.

In contrast to trailer 100, cylindrical trailer 200 may be formed of extruded panels, but which are instead annular extruded panels 250 (only five of which are identified in each of FIGS. 7 to 9, to avoid obscuring the drawings, though it will be understood that such reference intends to encompass all of the panels 250 included in the container 210). As shown in FIG. 10, such extruded panels may similarly have an outer skin 252, an inner skin 254, webs 256 bridging the outer skins 252 and inner skins 254, and tongue 258 and groove 259 at opposite edges of the panel. The cross-section may be flat, however, as opposed to curved. Instead, as shown in FIGS. 7 to 9, the panel 250 may be curved along its length, and thus may describe an arc having an arc radius. In this way, one of more such curved panels 250 may be joined end-to-end to provide an annular panel 250, and the channels formed by the inner skins 254 and outer skins 252 and the bridging webs 256 may also form annuli. A plurality of such annular assembled panels 250 may be assembled and joined at abutting edges 260, by mating of corresponding and abutting grooves 259 and tongues 258, and affixed, which may also be by fasteners or welds, to form the cylindrical tube of the container 210. The panels may be formed of any desired and suitable material, which may be metal, such as steel or aluminum, and may have any suitable dimensions and configurations, including those or ones similar to those described above in connection with longitudinal panel 150.

The annular, curved extruded panels 250 may be made by providing flat, extruded panels of the desired cross-section, as described and shown in FIG. 10, and then bending the panels to have the desired curved shape and radius. This may be done using the method described in U.S. Pat. No. 6,688,673, the entirety of the contents of which are incorporated herein by reference. In particular, each annular panel 250 may be formed from a single flat, extruded panel bent into a complete annulus, with the ends of the bent single panel joined, for example by fasteners or welds, to form a continuous annulus. Alternatively, each annular panel 250 may be formed from a plurality of curved panels joined at abutting ends, by fasteners or welds, the curved panels having a common radius of curvature, such that when they are all joined together they form the annular panel 250 as described.

Figure 11:
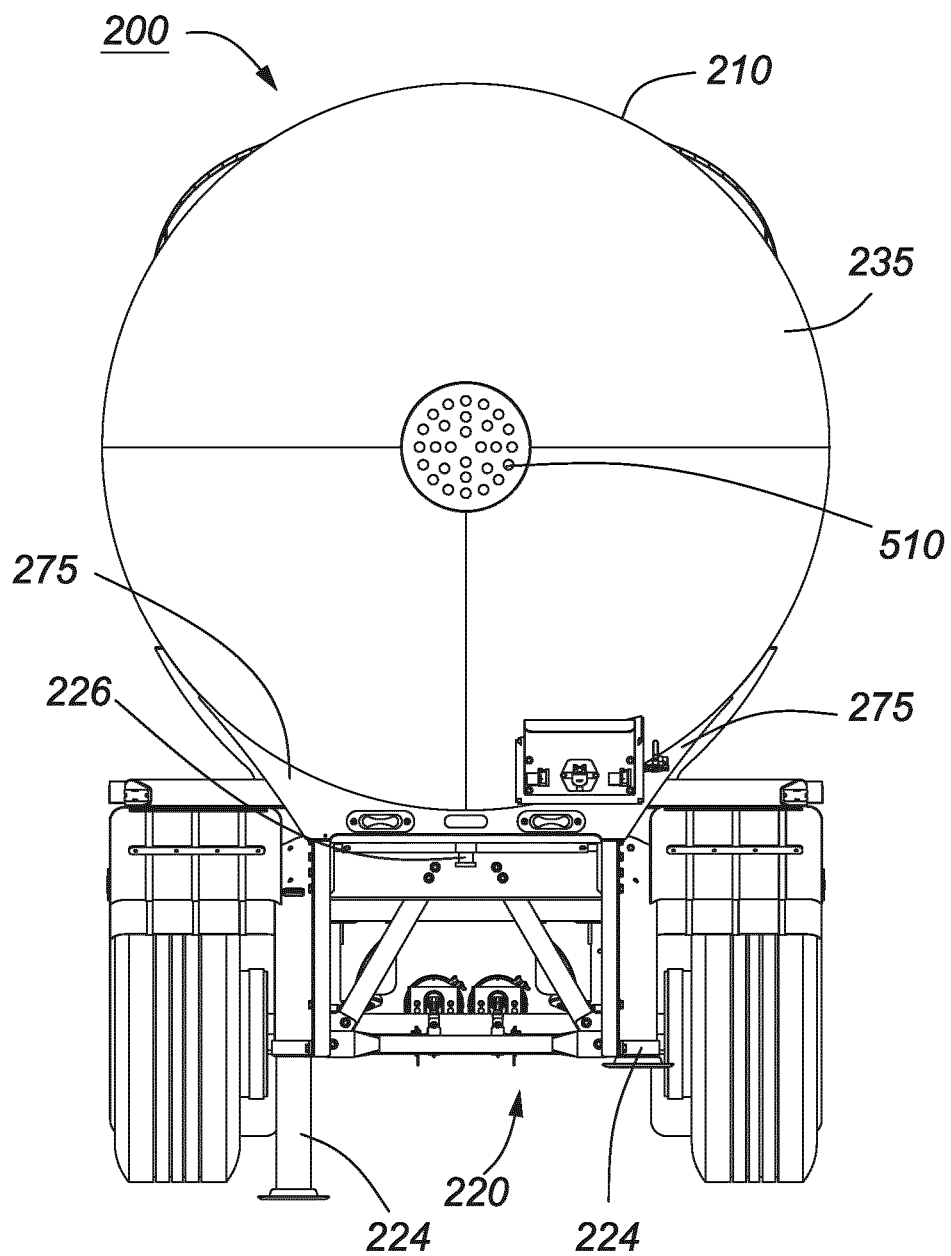
FIG. 11 is an end view a cylindrical cargo trailer.

With reference to FIG. 9, the cylindrical container 210 constructed of annular panels 250 may be provided with one or more longitudinal rails 270 affixed to the container 210, for example by fasteners or welds, for mounting of the container 210 to the chassis of a wheeled suspension 220, or for the attachment of other components such as landing gear 224 or hitch 226. The rails 270 may also provide structure to the container 210. The rails 270 may be provided with one or more structural flanges 275, which may be at or near the front end of the container, as shown in FIG. 11.

While the above description relates to a cylindrical trailer, the same principles are applicable to a cylindrical container mounted to a unitary chassis with a truck, as is done in a tanker truck, or alternatively as a tanker railcar. The size and configuration of the cylindrical container may be selected for mounting on the chassis of a tanker truck or tanker railcar, as appropriate.

With reference to FIGS. 5 & 6, the container 110 of FIGS. 1 to 3 may include a plurality of longitudinal channels 180 formed in the wall of the container 110, in particular formed by the inner skin 154, outer skin 152, and webs 156 of the extruded panels 150. Such longitudinal channels 180 may extend a part or an entirety of the length of the container 110. For at least one of the channels 180, the container 110 may have an inlet (not shown) at one end of the channel 180 and an outlet (not shown) at an opposite end of the channel 180. The channel 180 may be used to carry fluid fed into the inlet and drained from the outlet. A number of the channels 180 may be so configured. A feed manifold (not shown) may be coupled to the inlets, either by direct, rigid couplings or pipes, or by a corresponding number of flexible hoses. The trailer 100 may have a fluid supply apparatus (not shown), which may include a pump (not shown) to pump fluid to the inlet manifold and from there to the channels. A return manifold (not shown) may be coupled to the channel outlets, either by direct, rigid couplings or pipes (not shown), or by a corresponding number of flexible hoses, to return spent fluid to the fluid supply apparatus.

The fluid supply apparatus may include a fluid heating device (not shown) to heat the fluid. In this way, heated fluid may be pumped into the wall of the container 110 to warm the container wall, and circulate back to the fluid heating device to be reheated. Such a configuration may be useful when the container forms part of a truck, trailer, or railcar used in a cold climate, and it is desired to prevent or reduce freezing or sticking of the contents of the container to an inside surface of the container due to the cold temperatures. Similarly, the fluid supply apparatus may include a fluid cooling device (not shown) to cool the fluid. In this way, cooled fluid may be pumped into the container walls channels to cool the container wall, and circulate back to the fluid cooling device to be re-cooled. In this way the fluid supply apparatus may be used to cool the contents of the container. The fluid heating device or fluid cooling device may include a pump to pump the fluid through the channels and supply pipes, hoses, and/or manifold, and may be connected to be powered by an engine of a truck to which the trailer is hitched, or the container is mounted, or a locomotive for pulling a railcar.

The fluid supply apparatus with fluid heating device may be substantially similar to the teaching of U.S. Pat. No. 8,662,405, the entirety of which is incorporated herein by reference, and for example may include the feed manifold, hot fluid source, valves, pipes, return manifold, and return pipe disclosed therein. Similarly, the channel inlets and outlets may include holes and plugs for feeding and emptying the fluid. The teachings of U.S. Pat. No. 8,662,405 may be adapted to provide a cooled liquid, instead of a heated liquid, for a container adapted to cool its contents, as described above.

Alternatively, the channels formed in the container wall may be filled with insulation. The channels may also be used to run electrical or plumbing lines along the length of the container, and may be configured with plastic liners, with appropriate inlets and outlets for passage of the electrical or plumbing lines into or out of the channels.

As discussed above, where the container 110, 210 is provided with a tailgate 147, 247, numerous constructions and configurations are possible in order to achieve various advantages.

Figure 12:
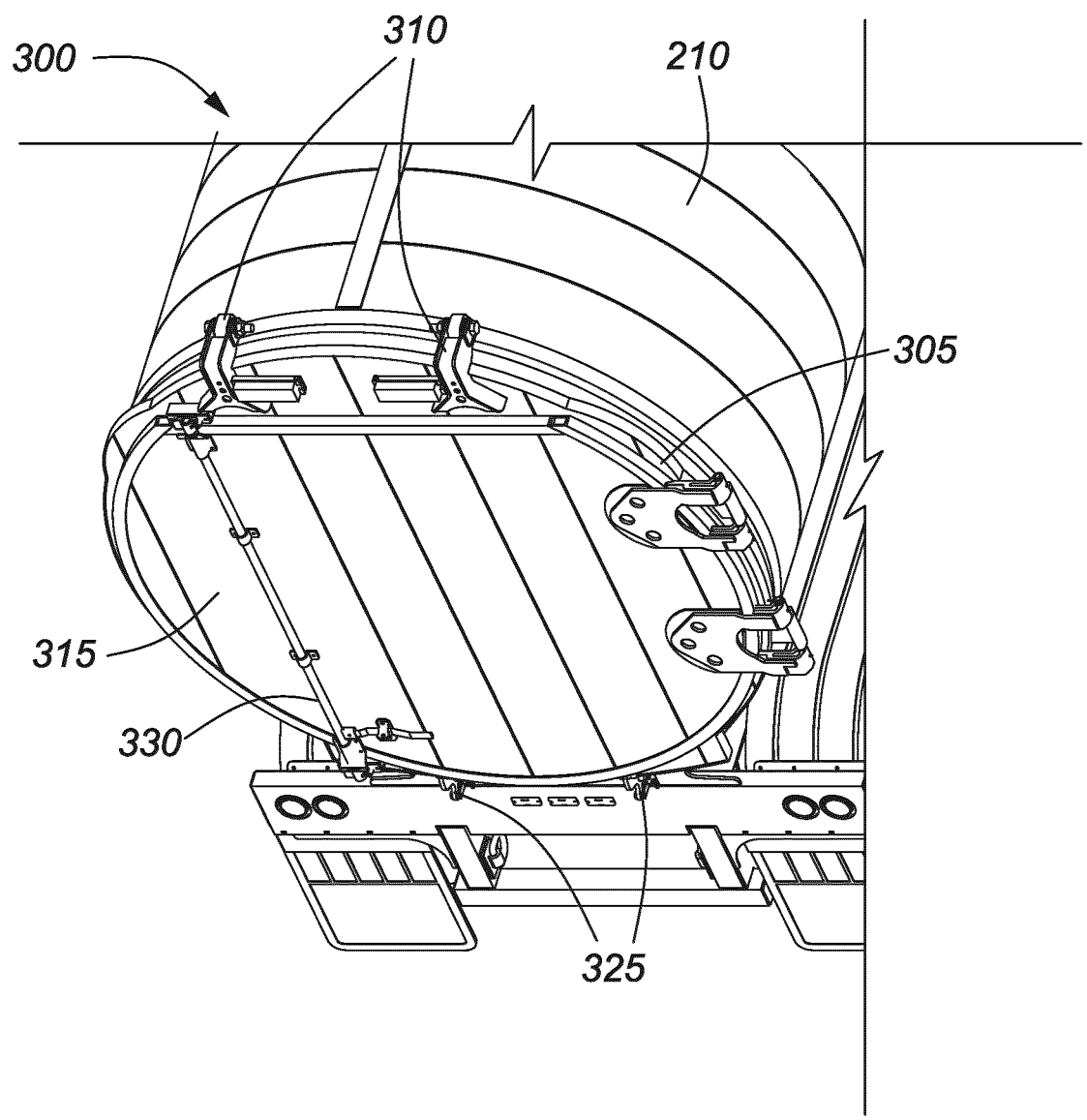
FIGS. 12-14 are perspective views of rear ends of a cylindrical cargo trailer showing a first compound tailgate.
Figure 13:
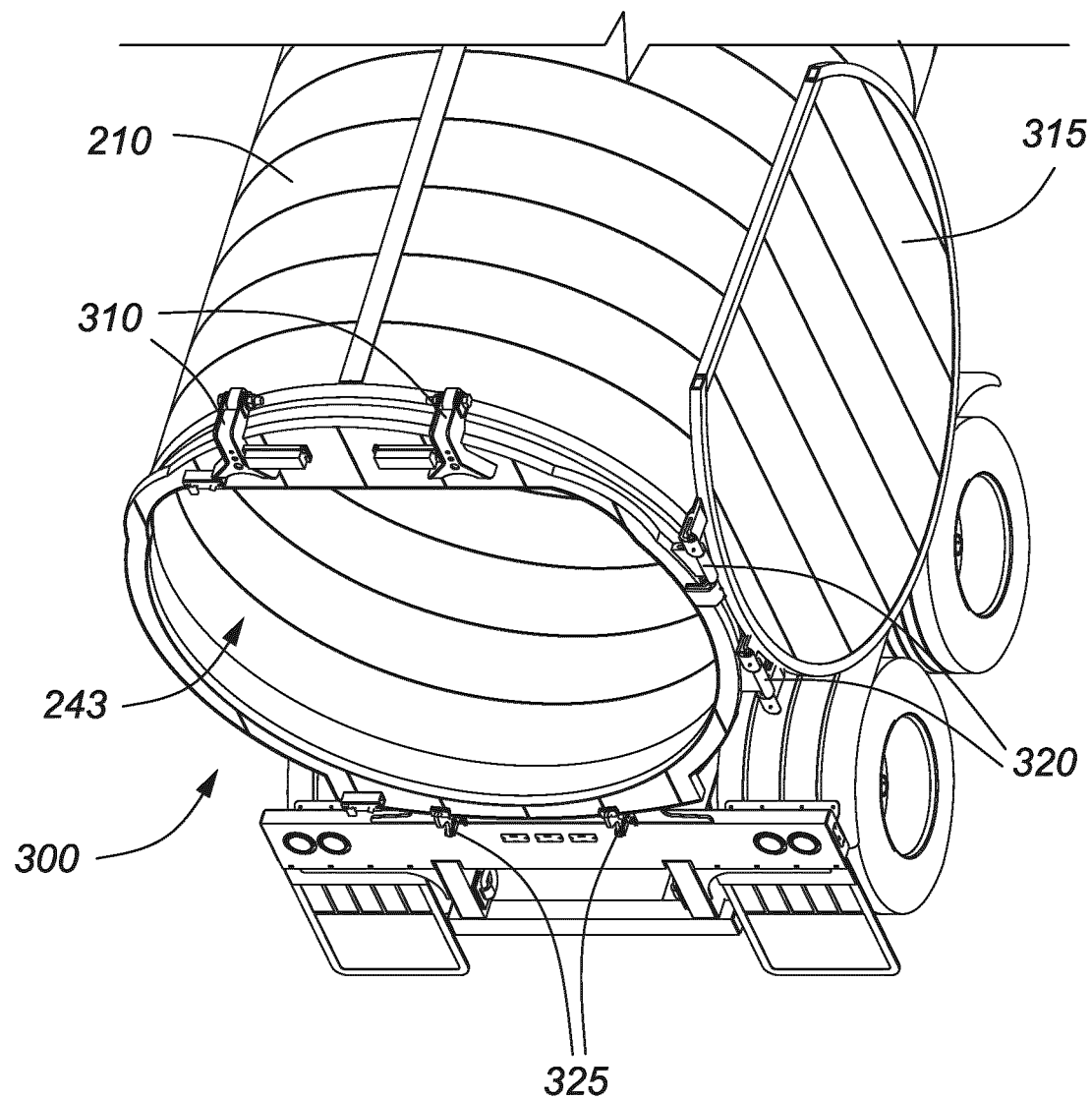
Figure 14:
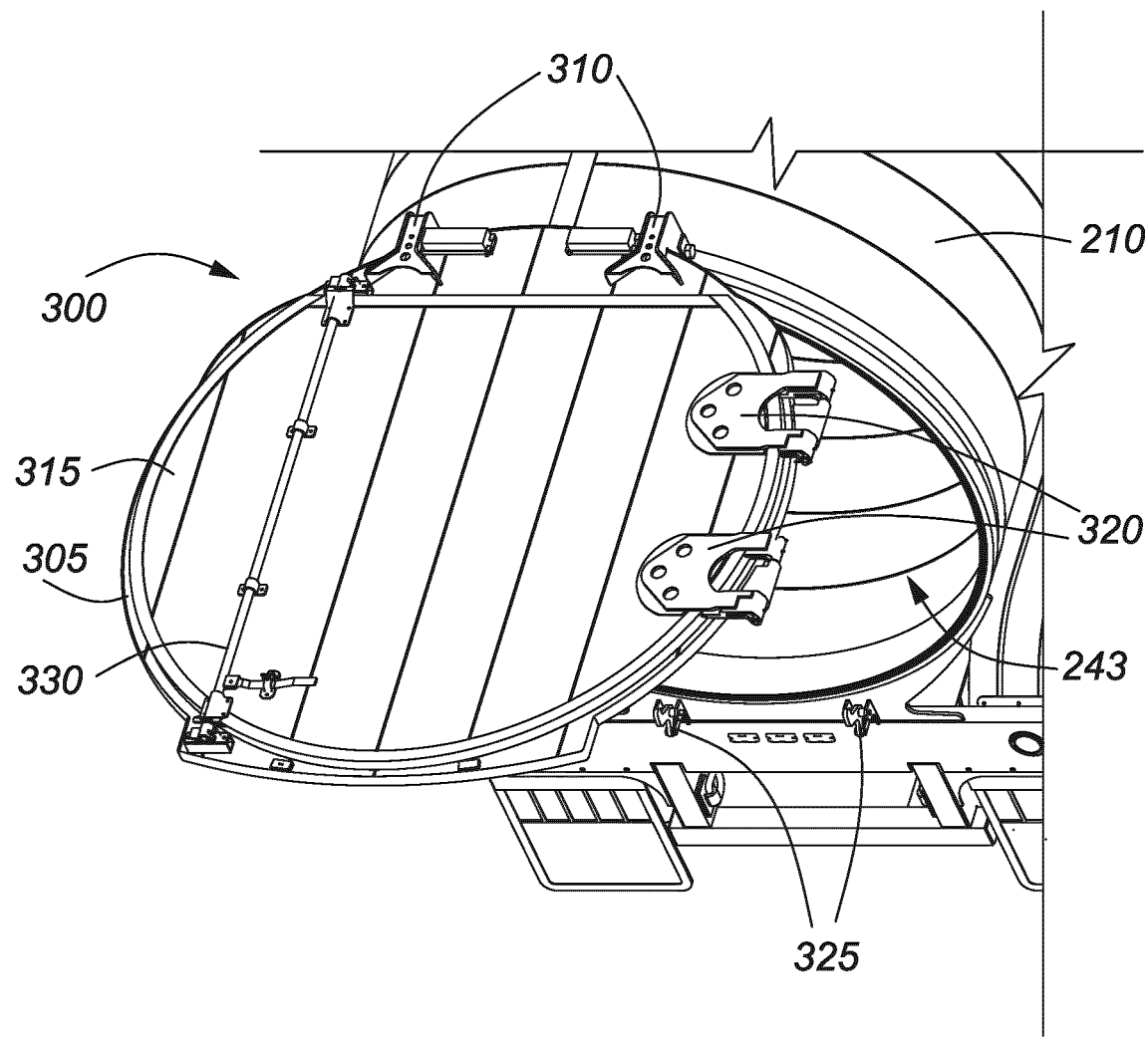

For example, as shown in FIGS. 12 to 14, container 210 may have a compound tailgate 300 which is openable both upwardly and laterally to one side. The compound tailgate 300 may include a frame 305 hingedly mounted, which may be by hinges 310, at or near an upper edge of the rear opening 243 of container 210. A door 315 of the tailgate 300 may be hingedly mounted to the frame 305 at a lateral side edge of the frame 305, which may be by hinges 320. In this way, the compound tailgate 300 may be openable hingedly upwardly by rotation about hinges 310, in which case the frame 305 and door 315 may move together as a unit, as shown in FIG. 14. Alternatively, the door 315 may be openable hingedly laterally, to one side, by rotation of the door 315 about hinges 320 while the frame 305 remains stationary, as shown in FIG. 13. The tailgate 300 may have a first locking mechanism 325 to clamp or otherwise to maintain the frame 305 closed and stationary relative to the container 210, and a separate second locking mechanism 330 to clamp or otherwise to maintain the door 315 closed and stationary relative to the frame 305. The container 210 so configured with the compound tailgate 300 may thus be useful for a tipper trailer when the first locking mechanism 325 is disengaged thus allowing the tailgate 300 to swing upwardly in the fashion of a tipper trailer, and otherwise to enable sideways opening of the door 315 when the second locking mechanism 330 is disengaged to enable loading of material into the container 210 through the rear opening 243. Although the compound tailgate 300 is shown in use with container 210 having annular panels 250, it may also be configured for use with the container 110 formed of longitudinal panels 150.

Figure 15:
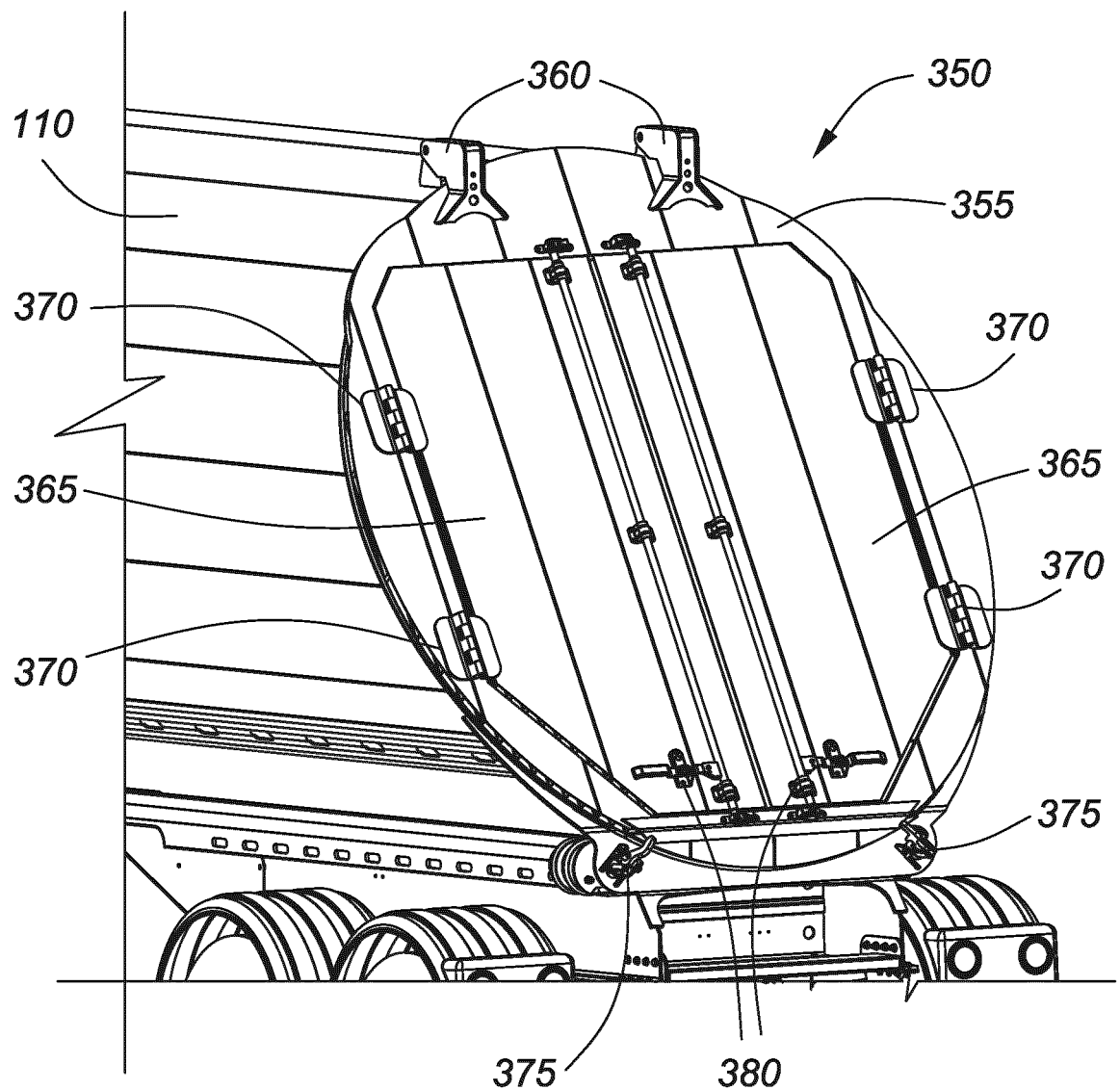
FIGS. 15-17 are perspective views of rear ends of a cylindrical cargo trailer showing a second compound tailgate.
Figure 16:
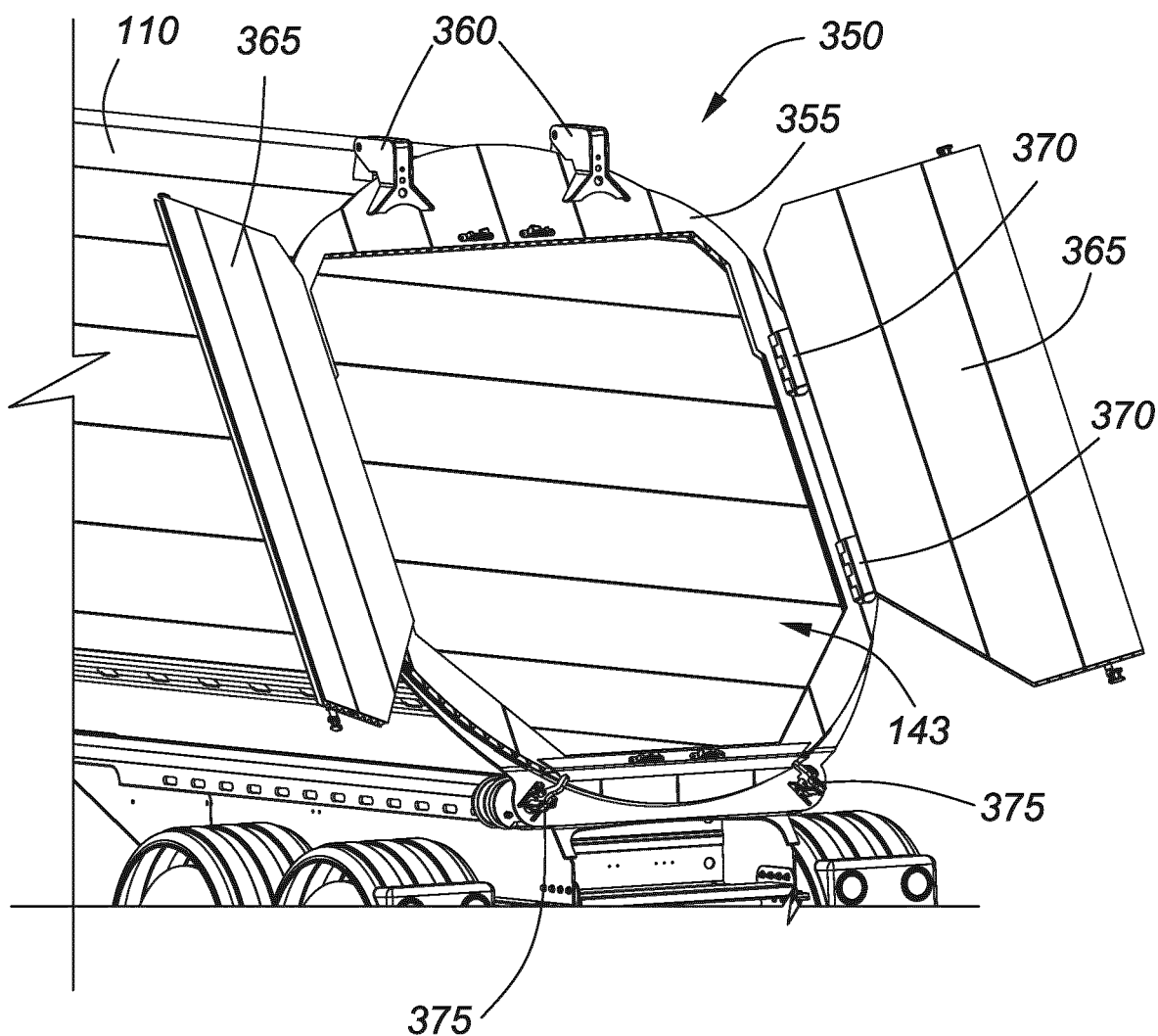
Figure 17:
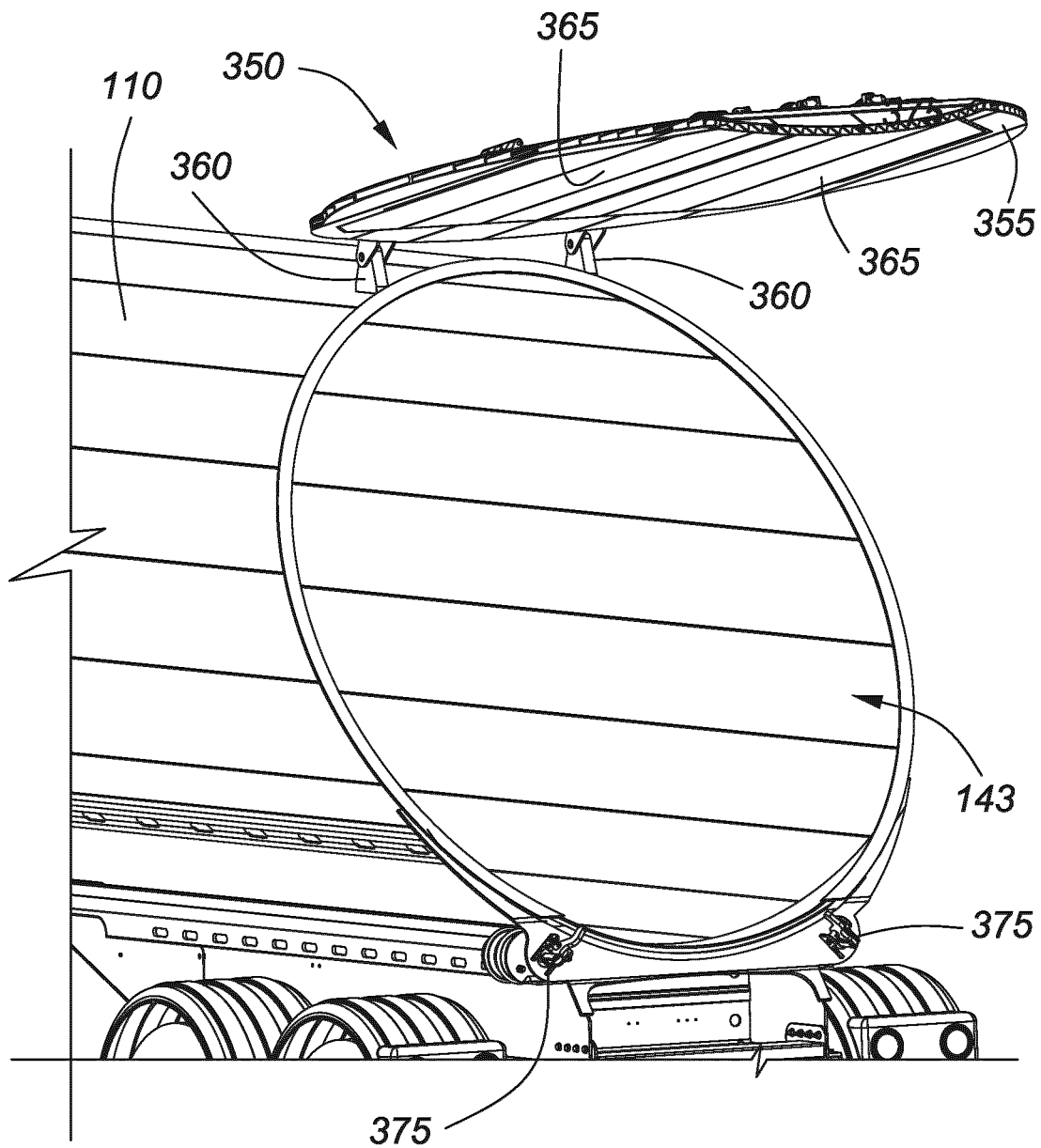

Another compound tailgate 350 is shown in FIGS. 15 to 17, which is also openable both upwardly and laterally to one side. The compound tailgate 350 may include a frame 355 hingedly mounted, which may be by hinges 360, at or near an upper edge of the rear opening 143 of container 110. Two opposing doors 365 of the tailgate 350 may each be hingedly mounted to the frame 355 at opposite lateral side edges of the frame 355, which may be by hinges 370. In this way, the compound tailgate 350 may be openable hingedly upwardly by rotation about hinges 360, in which case the frame 355 and doors 365 may move together as a unit, as shown in FIG. 17. Alternatively, the doors 365 may each be openable hingedly laterally, to one side, by rotation of the door 365 about hinges 370 while the frame 355 remains stationary, as shown in FIG. 16. The tailgate 350 may have a first locking mechanism 375 to clamp or otherwise to maintain the frame 355 closed and stationary relative to the container 110, and for each door 365 a separate second locking mechanism 380 to clamp or otherwise to maintain the door 365 closed and stationary relative to the frame 355. The container 110 so configured with the compound tailgate 350 may thus be useful for a tipper trailer when the first locking mechanism 375 is disengaged thus allowing the tailgate 350 to swing upwardly in the fashion of a tipper trailer, and otherwise to enable sideways opening of each door 365 when the corresponding second locking mechanism 380 is disengaged to enable loading of material into the container 110 through the rear opening 143. Although the compound tailgate 350 is shown in use with container 110 having longitudinal panels 150, it may also be configured for use with the container 210 formed of annular panels 250.

The frame 305, 355 and/or or doors 315, 365 may have any desired construction and configuration. For example, either or both of the frame 305, 355 and/or or doors 315, 365 may each be formed in part of a plurality of extruded panels, which may be formed of metal, which may be of steel or aluminum, assembled together in tongue-and-groove fashion, and joined with fasteners or welds.

Figure 18:
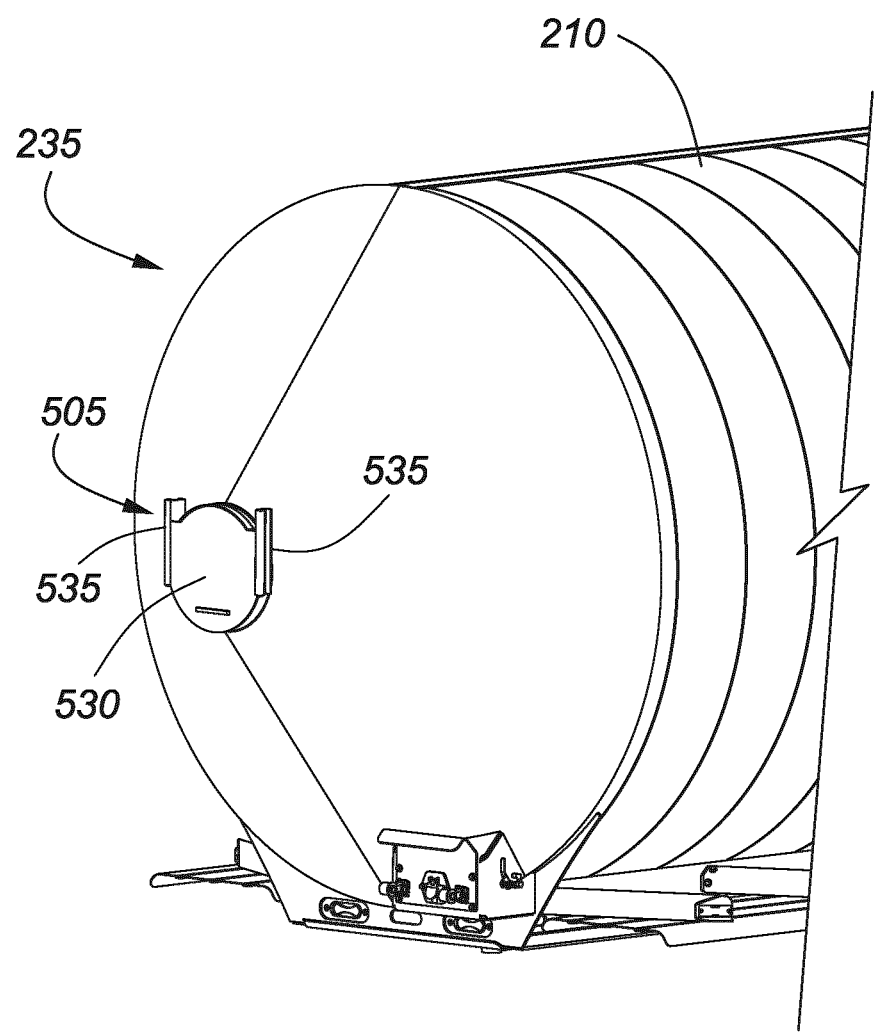
FIGS. 18-20 are perspective views of front ends of a number of cylindrical cargo trailers showing a number of front walls.
Figure 19:
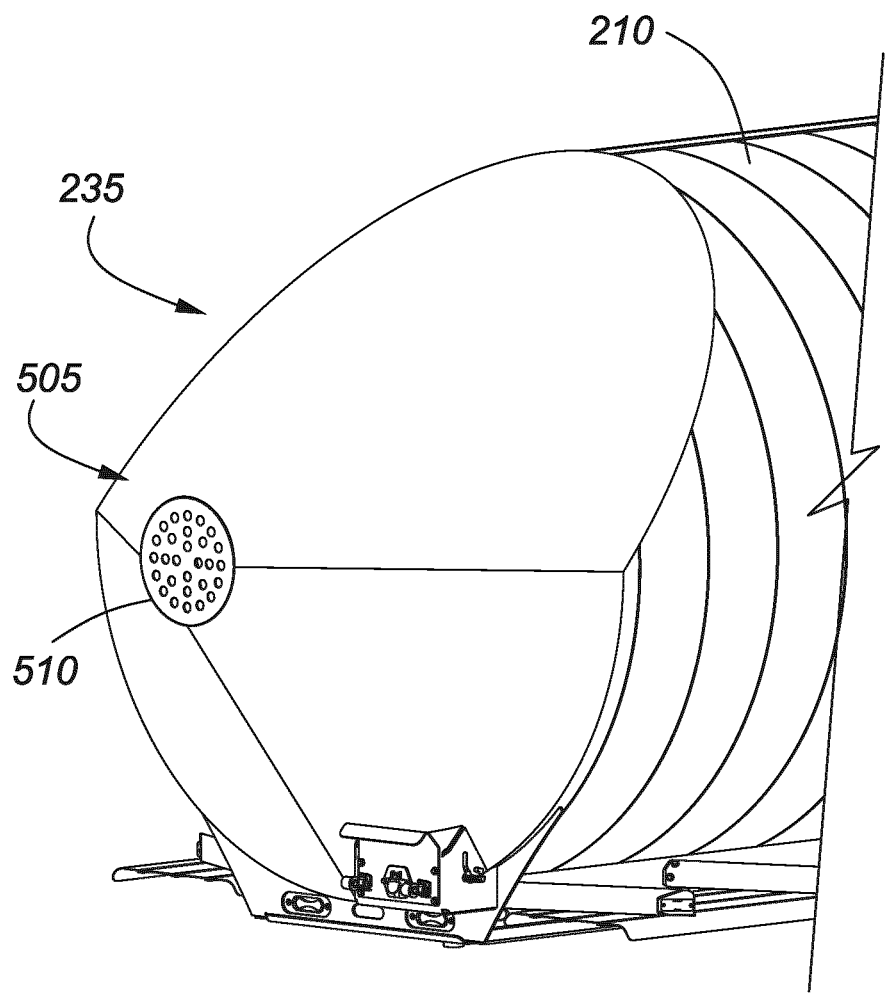
Figure 20:
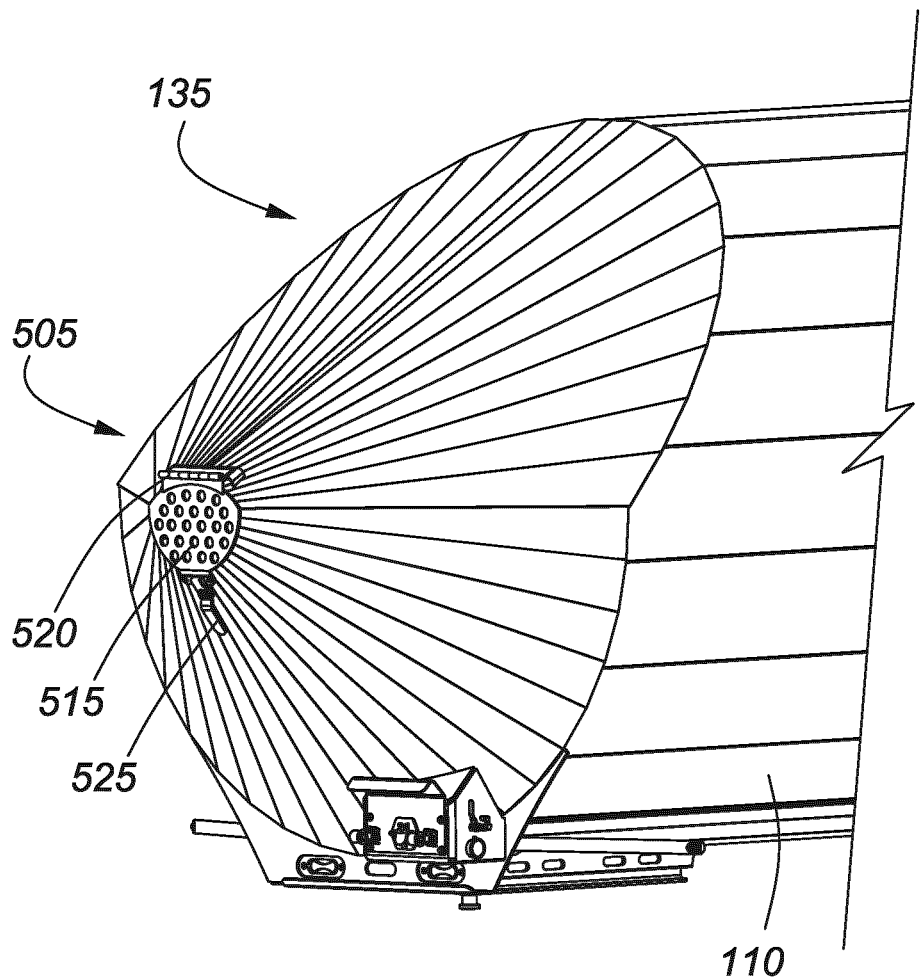

As noted above, the container 110, 210 may have a front wall 135, 235, for which a number of advantageous configurations are possible, including without limitations those shown in FIGS. 18 to 20. For example, the front wall 135, 235 may be formed so as to be generally conical in shape, as shown in FIG. 18, or instead with separate sloped sections as shown in FIGS. 19 and 20. The front wall 135, 235 may be formed with a smooth continuous surface, as shown in FIGS. 18 and 19, or with a ridged surface, as shown in FIG. 20. The front wall 135, 235 may have a single sheet of material, such as sheet metal, formed into the desired shape, or may instead be formed of a plurality of panels, which may be extruded panels, and assembled and fastened, cemented, or welded into the desired shape. In any event, an opening may be provided at a forward apex 505 of the front wall 135, 235, or elsewhere, to function as an access port or a vent for the release of air pressure developed by the loading of cargo into the rear opening 143, 243 of the container 110, 210. For example, the front wall 135, 235 may have a fixed vent 510 including a plate with numerous small openings. The front wall 135, 235 may alternatively have a port door 515 having a plate mounted via hinges 520 to the front wall 135, 235 and hingedly openable to expose an access port, with a locking mechanism 525 selectively to maintain the port door 515 closed. The port door 515 may also have numerous small openings so as to function as a vent when closed. Further alternatively, the front wall 135, 235 may have a port door 530 without vent openings, and retained in retaining grooves 535 and slidably removable to expose a port. Other configurations are possible.

Further configurations and components are possible. For example, the trailer 100, 200 may include a shield 400 which shields at least a part of the wheeled suspension 120, 220 from road contaminants, and to improve aerodynamics of the trailer 100, 200. The trailer 100, 200 may be provided near its front end 130, 230 with fenders 410 (shown in FIGS. 7 to 9), or these may be omitted if a towing truck has fenders. In the latter case, the trailer 100, 200 may have an extended rod 420 which extends outwardly from the center of the container 110, 220, and a light or reflector (not shown) may be mounted at respective ends of the extended rods 420 as appropriate if required by location regulations. The container 110, 210 may be provided with additional reinforcing panels 430, if desirable or required, where the container 110, 210 is mounted to the wheeled suspension 120, 220.

The truck, trailer, or railcar may be used with a compactor, for example to compact municipal or industrial waste in the container as it is loaded. While the use of conventional rectangular, box-shaped containers to receive, compact, and transport waste is well-known and widespread, the use of cylindrical containers for this purpose is unknown for the reasons given above, namely that cylindrical containers of conventional construction which are sufficiently rigid to withstand the force of compaction are too heavy for economical use for waste transport. The presently-disclosed cylindrical trailers, formed of extruded panels, solve this problem. Moreover, such cylindrical trailers possess a material advance over conventional rectangular trailers for use in waste transport specifically in relation to the process of compaction. One problem routinely experienced during compaction of waste in rectangular trailers is that the waste often develops outward pressure in all directions, including against the inward faces of the sidewalls of the container, resulting in outward bulging or bowing of the sidewalls. As a result, the sidewalls must typically be constructed to withstand greater pressure, leading to increase materials requirements, container weight, and cost. With a cylindrical container, however, this outward force is evenly distributed about the circumference of the circular cross-section of the container thereby avoiding such problematic bulging and moreover avoiding enabling lighter construction. Another problem experienced in the use of rectangular containers for compaction and transport of waste is that it is common for waste to be pressed into and stuck in the corners formed by the rectangular shape of the box. Additional time and effort, or extra measures, are often required to remove this stuck waste when the trailer is tipped for removal of the waste. The presently disclosed cylindrical trailer lacks such corners, however, and thus removal of waste by tipping or otherwise is facilitated.

A cylindrical container for a truck, trailer, or railcar as described herein has numerous further advantages. It may be made smooth inside and outside, with optimal aerodynamics. Compared to traditional tanker containers it may also have reduced weight. Both of these advantages may result in better fuel economy. The extruded panels, having inner and outer skins, may provide impact protection from without, and as well content retention protection from within, in the event of puncturing impacts. It may be straightforward and cost-effective to provide linear items, such as rails for mounting to the chassis, or for mounting landing gear or a hitch, by including them in the extrusion profile of one or more of the panels.

The following are non-limiting examples of containers according to the disclosure herein.

EXAMPLE 1

A cylindrical cargo container comprising a plurality of extruded panels having a common curved shape characterized by a curvature, wherein adjacent pairs of the panels are joined at respective abutting edges, and the joined panels form a cylindrical tube.

EXAMPLE 2

The cylindrical cargo container according to Example 1, wherein for at least one of the extruded panels an extrusion axis of the panel is parallel to a longitudinal axis of the cylindrical tube, and a cross-section profile of the panel perpendicular to the extrusion axis has the curved shape.

EXAMPLE 3

The cylindrical cargo container according to Example 1, wherein for each one of the extruded panels an extrusion axis of the panel is parallel to a longitudinal axis of the cylindrical tube, and a cross-section of the panel perpendicular to the extrusion axis has the curved shape.

EXAMPLE 4

The cylindrical cargo container according to Example 3, wherein each extruded panel is formed by extrusion with an extrusion profile being the cross-section having the curved shape.

EXAMPLE 5

The cylindrical cargo container according to Example 3, wherein each extruded panel is formed by extrusion with an extrusion profile lacking the curved shape, and is bent to provide the extruded panel having the cross-section having the curved shape.

EXAMPLE 6

The cylindrical cargo container according to any one of Examples 3 to 5, wherein the curved shape of each of the extruded panels has a common arc length.

EXAMPLE 7

The cylindrical cargo container according to any one of Examples 3 to 5, wherein the curved shape of at least a first one of the extruded panels has a first arc length different from a second arc length of the curved shape of at least a second one of the extruded panels.

EXAMPLE 8

The cylindrical cargo container according to any one of Examples 3 to 7, wherein each one of the extruded panels has a common longitudinal length.

EXAMPLE 9

The cylindrical cargo container according to any one of Examples 3 to 7, wherein at least a first one of the extruded panels has a first longitudinal length different from a second longitudinal length of at least a second one of the extruded panels.

EXAMPLE 10

The cylindrical cargo container according to any one of Examples 1 to 9, wherein at least one of the panels comprises an extruded projection configured for coupling to a support.

EXAMPLE 11

The cylindrical cargo container according to Example 10, wherein the extruded projection comprises a rail integral with and extending along a length of the at least one panel and configured for mounting to the support.

EXAMPLE 12

The cylindrical cargo container according to any one of Examples 1 to 9, wherein each of two of the panels comprises an extruded projection configured for coupling to a support, the extrusion projection comprising a rail integral with and extending along at least a part of a length of the panel and configured for mounting to the support, wherein the two panels are relatively positioned to form the cylindrical tube such that the corresponding rails are symmetrically positioned relative to a transverse center of the container.

EXAMPLE 13

The cylindrical cargo container according to any one of Examples 6 to 12, wherein the support comprises landing gear, a fifth wheel, or a hitch.

EXAMPLE 14

The cylindrical cargo container according to Example 1, wherein for at least one of the extruded panels an extrusion axis of the panel is perpendicular to a longitudinal axis of the cylindrical tube, and a cross-section of the panel perpendicular to the longitudinal axis has the curved shape.

EXAMPLE 15

The cylindrical cargo container according to Example 14, wherein for each one of the extruded panels an extrusion axis of the panel is perpendicular to a longitudinal axis of the cylindrical tube, and a cross-section of the panel perpendicular to the longitudinal axis has the curved shape.

EXAMPLE 16

The cylindrical cargo container according to Example 15, wherein each panel is formed by extrusion lacking the curved shape, and is bent to provide the panel having the cross-section having the curved shape.

EXAMPLE 17

The cylindrical cargo container according to any one of Examples 1 to 16, wherein the adjacent pairs of the panels are joined at the respective abutting edges in a tongue-and-groove joint, wherein a tongue provided at the abutting edge of one of the panels is mated in a groove provided at the abutting edge of the other one of the panels.

EXAMPLE 18

The cylindrical cargo container according to any one of Examples 1 to 17, wherein adjacent panels are joined at the respective abutting edges using fasteners or welds.

EXAMPLE 19

The cylindrical cargo container according to any one of Examples 1 to 18, wherein the panels are formed of aluminum.

EXAMPLE 20

The cylindrical cargo container according to any one of Examples 1 to 19, wherein each panel comprises an inner skin and an outer skin sandwiching a plurality of webs bridging a space between the inner skin and the outer skin.

EXAMPLE 21

The cylindrical cargo container according to Example 20, wherein the outer skin has a thickness of at least 1 mm, the inner skin has a thickness of at least 2 mm, the webs each have a thickness of at least 1 mm, the outer skin and the inner skin are spaced by a gap of at least 30 mm, and the webs are spaced by a gap of at least 15 mm.

EXAMPLE 22

The cylindrical cargo container according to Example 20, wherein the outer skin has a thickness of about 2.5 mm, the inner skin has a thickness of about 3.5 mm, the webs each have a thickness of about 2.5 mm, the outer skin and the inner skin are spaced by a gap of about 38 mm, and the webs are spaced by a gap of about 25 mm.

EXAMPLE 23

The cylindrical cargo container according to Example 20, wherein the outer skin has a thickness of from 2 mm to 3 mm, the inner skin has a thickness of from 3 mm to 4 mm, the webs each have a thickness of from 2 mm to 3 mm, the outer skin and the inner skin are spaced by a gap of from 35 mm to 40 mm, and the webs are spaced by a gap of from 20 mm to 30 mm.

EXAMPLE 24

The cylindrical cargo container according to any one of Examples 20 to 23, wherein for at least one of the panels, the outer skin, the inner skin, and the webs form a channel.

EXAMPLE 25

The cylindrical cargo container according to Example 24, wherein the channel is configured to contain or to transport fluid.

EXAMPLE 26

The cylindrical cargo container according to Example 25, wherein the fluid is leachate when the cargo comprises waste.

EXAMPLE 27

The cylindrical cargo container according to Example 24, wherein the channel is configured to contain insulation.

EXAMPLE 28

The cylindrical cargo container according to Example 24, wherein the channel is configured to house electrical or plumbing lines.

EXAMPLE 29

The cylindrical cargo container according to Example 28, wherein the channel contains a plastic liner comprising at least one of an inlet and an outlet for passage of the electrical or plumbing lines.

EXAMPLE 30

The cylindrical cargo container according to any one of Examples 20 to 29 when dependent on any one of Examples 10 to 13, wherein, for the at least one of the panels comprising the extruded projection, at least one of the outer skin, the inner skin, or at least one of the webs, has a thickness, at or about a portion of the panel adjoining the extruded projection, greater than a thickness of the outer skin, the inner skin, or at least one other one of the webs, other than at or about the portion.

EXAMPLE 31

The cylindrical cargo container according to any one of Examples 20 to 29 when dependent on any one of Examples 10 to 13, wherein, for the at least one of the panels comprising the extruded projection, respective thicknesses of the outer skin, the inner skin, and the webs, are greater than respective thicknesses of the outer skin, the inner skin, and the webs of the panels different from the at least one of the panels comprising the extruded projection.

EXAMPLE 32

The cylindrical cargo container according to any one of Examples 1 to 31 having a front wall and an end wall enclosing the container.

EXAMPLE 33

The cylindrical cargo container according to any one of Examples 1 to 31 having a front wall and a rear opening for passage of the cargo, and a tailgate hingedly mounted at or adjacent a perimeter of the rear opening closeable to retain the cargo in the container and openable to permit passage of the cargo through the rear opening.

EXAMPLE 34

The cylindrical cargo container according to Example 33, wherein the tailgate comprises a compound tailgate openable both upwardly and laterally to one side, the compound tailgate comprising a frame hingedly mounted at or near an upper edge of the rear opening of the container, and a door hingedly mounted to the frame at a lateral side edge of the frame.

EXAMPLE 35

The cylindrical cargo container according to Example 33, wherein the tailgate comprises a compound tailgate comprising a frame hingedly mounted by first hinges at or near an upper edge of the rear opening of the container, and a door hingedly mounted by second hinges to the frame at a lateral side edge of the frame, wherein the compound tailgate is openable hingedly upwardly by rotation about the first hinges wherein the frame and door move together as a unit, and the door is openable hingedly laterally to one side by rotation of the door about the second hinges while the frame remains stationary.

EXAMPLE 36

The cylindrical cargo container according to Example 35, wherein the tailgate further comprises a first locking mechanism selectively to maintain the frame closed and stationary relative to the container, and a second locking mechanism, different from the first locking mechanism, selectively to maintain the door closed and stationary relative to the frame.

EXAMPLE 37

The cylindrical cargo container according to Example 35 or 36, wherein the door is a first door, and the lateral side edge of the frame is a first lateral side edge of the frame, the tailgate further comprising a second door hingedly mounted by third hinges to the frame at a second lateral side edge of the frame transversely opposite the first lateral side edge of the frame, wherein the second door is openable hingedly laterally to one side by rotation of the second door about the third hinges while the frame remains stationary.

EXAMPLE 38

The cylindrical cargo container according to Example 37, wherein the tailgate further comprises a third locking mechanism different from the first locking mechanism, selectively to maintain the second door closed and stationary relative to the frame.

EXAMPLE 39

The cylindrical cargo container according to any one of Examples 32 to 38, wherein the front wall comprises an access port or vent at a forward apex of the front wall.

EXAMPLE 40

The cylindrical cargo container according to any one of Example 39, wherein the access port or vent comprises a port door having a plate mounted to the front wall and openable to expose an opening.

EXAMPLE 41

The cylindrical cargo container according to Example 40, wherein the port door comprises a plurality of vent openings.

EXAMPLE 42

The cylindrical cargo container according to any one of Examples 1 to 41 substantially free from reinforcing annular bands or ribs.

EXAMPLE 43

The cylindrical cargo container according to any one of Examples 1 to 42, wherein an inside surface of the cylindrical cargo container is free from projections.

EXAMPLE 44

A trailer comprising the cylindrical cargo container according to any one of Examples 1 to 43 mounted to a chassis supported by a wheeled suspension.

EXAMPLE 45

The trailer according to Example 44 comprising a shield mounted at an underside of the container adjacent the wheeled suspension to shield at least a part of the wheeled suspension.

EXAMPLE 46

A railcar comprising the cylindrical cargo container according to any one of Examples 1 to 43 mounted to a chassis supported by a wheeled suspension.

EXAMPLE 47

An extruded panel for construction of a cylindrical cargo container, wherein a cross-section of the panel perpendicular to an extrusion axis of the panel has a curved shape.

EXAMPLE 48

The extruded panel according to Example 47 formed by extrusion with an extrusion profile being the cross-section having the curved shape.

EXAMPLE 49

The extruded panel according to Example 47 formed by extrusion with an extrusion profile lacking the curved shape, and bent to provide the extruded panel having the cross-section having the curved shape.

EXAMPLE 50

The extruded panel according to any one of Examples 47 to 49 comprising a tongue provided at a first edge of the panels and a groove at an second edge of the panel opposite the first edge.

EXAMPLE 51

The extruded panel according to any one of Examples 47 to 50 formed of aluminum.

EXAMPLE 52

The extruded panel according to any one of Examples 47 to 51 comprising an inner skin and an outer skin sandwiching a plurality of webs bridging a space between the inner skin and the outer skin.

EXAMPLE 53

The extruded panel according to Example 52, wherein the outer skin has a thickness of at least 1 mm, the inner skin has a thickness of at least 2 mm, the webs each have a thickness of at least 1 mm, the outer skin and the inner skin are spaced by a gap of at least 30 mm, and the webs are spaced by a gap of at least 15 mm.

EXAMPLE 54

The extruded panel according to Example 52, wherein the outer skin has a thickness of about 2.5 mm, the inner skin has a thickness of about 3.5 mm, the webs each have a thickness of about 2.5 mm, the outer skin and the inner skin are spaced by a gap of about 38 mm, and the webs are spaced by a gap of about 25 mm.

EXAMPLE 55

The extruded panel according to Example 52, wherein the outer skin has a thickness of from 2 mm to 3 mm, the inner skin has a thickness of from 3 mm to 4 mm, the webs each have a thickness of from 2 mm to 3 mm, the outer skin and the inner skin are spaced by a gap of from 35 mm to 40 mm, and the webs are spaced by a gap of 20 mm to 30 mm.

EXAMPLE 56

The extruded panel according to any one of Examples 52 to 55, wherein the outer skin, the inner skin, and the webs form a channel.

EXAMPLE 57

The extruded panel according to Example 56, wherein the channel is configured to contain or to transport fluid.

EXAMPLE 58

The extruded panel according to Example 56, wherein the channel is configured to contain insulation.

EXAMPLE 59

The extruded panel according to Example 56, wherein the channel is configured to house electrical or plumbing lines.

EXAMPLE 60

The extruded panel according to Example 59, wherein the channel contains a plastic liner comprising at least one of an inlet and an outlet for passage of the electrical or plumbing lines.

EXAMPLE 61

The extruded panel according to any one of Examples 47 to 60 comprising a rail integral with and extending along a length of the panel and configured for mounting to a support.

EXAMPLE 62

The extruded panel according to Example 61, wherein the support comprises landing gear, a fifth wheel, or a hitch.

EXAMPLE 63

The extruded panel according to Example 61 or 62 when dependent on any one of Examples 52 to 60, wherein at least one of the outer skin, the inner skin, or at least one of the webs, has a thickness, at or about a portion of the panel adjoining the extruded projection, greater than a thickness of the outer skin, the inner skin, or at least one other one of the webs, other than at or about the portion.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A cylindrical cargo container comprising a plurality of extruded panels having a common curved shape characterized by a curvature, wherein adjacent pairs of the panels are joined at respective abutting longitudinal edges, and the joined panels form a cylindrical tube,
wherein for each one of the extruded panels an extrusion axis of the panel is parallel to the longitudinal axis of the cylindrical tube, and a cross-section of the panel perpendicular to the extrusion axis has the curved shape, and the cross-sectional profile defines an inner skin of the panel and an outer skin of the panel sandwiching a plurality of webs of the panel bridging a space between the inner skin and the outer skin, and
wherein the curved shape of at least a first one of the extruded panels has a first arc length different from a second arc length of the curved shape of at least a second one of the extruded panels.

2. A cylindrical cargo container comprising a plurality of extruded panels having a common curved shape characterized by a curvature, wherein adjacent pairs of the panels are joined at respective abutting longitudinal edges, and the joined panels form a cylindrical tube,
wherein for each one of the extruded panels an extrusion axis of the panel is parallel to the longitudinal axis of the cylindrical tube, and a cross-section of the panel perpendicular to the extrusion axis has the curved shape, and the cross-sectional profile defines an inner skin of the panel and an outer skin of the panel sandwiching a plurality of webs of the panel bridging a space between the inner skin and the outer skin, and
wherein at least a first one of the extruded panels has a first longitudinal length different from a second longitudinal length of at least a second one of the extruded panels.

3. A cylindrical cargo container comprising a plurality of extruded panels having a common curved shape characterized by a curvature, wherein adjacent pairs of the panels are joined at respective abutting longitudinal edges, and the joined panels form a cylindrical tube,
wherein for at least one of the extruded panels an extrusion axis of the panel is parallel to the longitudinal axis of the cylindrical tube, and a cross-section of the panel perpendicular to the extrusion axis has the curved shape, and the cross-sectional profile defines an inner skin of the panel and an outer skin of the panel sandwiching a plurality of webs of the panel bridging a space between the inner skin and the outer skin, and
wherein each of two of the panels comprises an extruded projection configured for coupling to a support, the extrusion projection comprising a rail integral with and extending along at least a part of a length of the panel and configured for mounting to the support, wherein the two panels are relatively positioned to form the cylindrical tube such that the corresponding rails are symmetrically positioned relative to a transverse center of the container.

4. The cylindrical cargo container according to claim 3, wherein for at least one of the extruded panels a longitudinal length of the panel is at least 10 times an arc length of the curved shape of the panel.

5. A cylindrical cargo container comprising a plurality of extruded panels having a common curved shape characterized by a curvature, wherein adjacent pairs of the panels are joined at respective abutting longitudinal edges, and the joined panels form a cylindrical tube,
wherein for at least one of the extruded panels an extrusion axis of the panel is parallel to the longitudinal axis of the cylindrical tube, a cross-section of the panel perpendicular to the extrusion axis has the curved shape, and the cross-sectional profile defines an inner skin of the panel and an outer skin of the panel sandwiching a plurality of webs of the panel bridging a space between the inner skin and the outer skin, and wherein the adjacent pairs of the panels are joined at the respective abutting longitudinal edges in a tongue-and-groove joint, wherein a tongue provided at the abutting longitudinal edge of one of the panels is mated in a groove provided at the abutting longitudinal edge of the other one of the panels.

6. The cylindrical cargo container according to claim 5, wherein for each one of the extruded panels an extrusion axis of the panel is parallel to the longitudinal axis of the cylindrical tube, and a cross-section of the panel perpendicular to the extrusion axis has the curved shape, and the cross-sectional profile defines an inner skin of the panel and an outer skin of the panel sandwiching a plurality of webs of the panel bridging a space between the inner skin and the outer skin.

7. The cylindrical cargo container according to claim 5, wherein the curved shape of each of the extruded panels has a common arc length.

8. The cylindrical cargo container according to claim 5, wherein each one of the extruded panels has a common longitudinal length.

9. The cylindrical cargo container according to claim 8, wherein the common longitudinal length is substantially an entire length of the container.

10. The cylindrical cargo container according to claim 5, wherein at least one of the panels comprises an extruded projection configured for coupling to a support.

11. The cylindrical cargo container according to claim 10, wherein the extruded projection comprises a rail integral with and extending along a length of the at least one panel and configured for mounting to the support.

12. The cylindrical cargo container according to claim 5, wherein adjacent panels are joined at the respective abutting longitudinal edges using fasteners or welds.

13. The cylindrical cargo container according to claim 5, wherein the panels are formed of aluminum.

14. The cylindrical cargo container according to claim 5, wherein for at least one of the panels, the outer skin, the inner skin, and the webs form a channel.

15. The cylindrical cargo container according to claim 5 having a front wall and a rear opening for passage of the cargo, and a tailgate hingedly mounted at or adjacent a perimeter of the rear opening closeable to retain the cargo in the container and openable to permit passage of the cargo through the rear opening.

16. The cylindrical cargo container according to claim 5 substantially free from reinforcing annular bands or ribs.

17. The cylindrical cargo container according to claim 5, wherein an inside surface of the cylindrical tube is free from projections.

18. A trailer comprising the cylindrical cargo container according to claim 5 mounted to a chassis supported by a wheeled suspension.

19. A railcar comprising the cylindrical cargo container according to claim 5 mounted to a chassis supported by a wheeled suspension.

20. The cylindrical cargo container according to claim 5, wherein for at least one of the extruded panels a longitudinal length of the panel is at least 10 times an arc length of the curved shape of the panel.

21. The cylindrical cargo container according to claim 5, wherein for each of the extruded panels a longitudinal length of the panel is at least 10 times an arc length of the curved shape of the panel.

22. A cylindrical cargo container comprising a plurality of extruded panels having a common curved shape characterized by a curvature, wherein adjacent pairs of the panels are joined at respective abutting longitudinal edges, and the joined panels form a cylindrical tube,
wherein for each one of the extruded panels an extrusion axis of the panel is parallel to the longitudinal axis of the cylindrical tube, and a cross-section of the panel perpendicular to the extrusion axis has the curved shape, and the cross-sectional profile defines an inner skin of the panel and an outer skin of the panel sandwiching a plurality of webs of the panel bridging a space between the inner skin and the outer skin, and
wherein at least one of the panels comprises an extruded projection configured for coupling to a support, and for the at least one of the panels comprising the extruded projection, at least one of the outer skin, the inner skin, or at least one of the webs, has a thickness, at or about a portion of the panel adjoining the extruded projection, greater than a thickness of the outer skin, the inner skin, or at least one other one of the webs, other than at or about the portion.

23. A cylindrical cargo container comprising a plurality of extruded panels having a common curved shape characterized by a curvature, wherein adjacent pairs of the panels are joined at respective abutting longitudinal edges, and the joined panels form a cylindrical tube,
wherein for at least one of the extruded panels an extrusion axis of the panel is parallel to the longitudinal axis of the cylindrical tube, and a cross-section of the panel perpendicular to the extrusion axis has the curved shape, and the cross-sectional profile defines an inner skin of the panel and an outer skin of the panel sandwiching a plurality of webs of the panel bridging a space between the inner skin and the outer skin, and
wherein the outer skin has a thickness of from 2 mm to 3 mm, the inner skin has a thickness of from 3 mm to 4 mm, the webs each have a thickness of from 2 mm to 3 mm, the outer skin and the inner skin are spaced by a gap of from 35 mm to 40 mm, and the webs are spaced by a gap of from 20 mm to 30 mm.

* * * * *